United States Patent
Agarwal et al.

(10) Patent No.: US 11,841,824 B2
(45) Date of Patent: *Dec. 12, 2023

(54) INCREMENTAL ACCESS REQUESTS FOR PORTIONS OF FILES FROM A CLOUD ARCHIVAL STORAGE TIER

(71) Applicant: Cohesity, Inc., San Jose, CA (US)

(72) Inventors: Sarthak Agarwal, Fremont, CA (US); Anirudh Kumar, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,053

(22) Filed: Sep. 19, 2022

(65) Prior Publication Data

US 2023/0010143 A1     Jan. 12, 2023

Related U.S. Application Data

(63) Continuation of application No. 17/030,770, filed on Sep. 24, 2020, now Pat. No. 11,487,701.

(51) Int. Cl.
    *G06F 16/00* (2019.01)
    *G06F 16/11* (2019.01)
    *G06F 16/13* (2019.01)

(52) U.S. Cl.
    CPC ............ *G06F 16/113* (2019.01); *G06F 16/13* (2019.01)

(58) Field of Classification Search
    None
    See application file for complete search history.

(56) References Cited

U.S. PATENT DOCUMENTS

| | | |
|---|---|---|
| 6,671,853 B1 | 12/2003 | Burkett |
| 7,039,663 B1 | 5/2006 | Federwisch |
| 7,325,109 B1 | 1/2008 | Muppalaneni |
| 7,809,868 B1 | 10/2010 | Mu |
| 8,352,422 B2 | 1/2013 | Prahlad |
| 8,412,688 B1 | 4/2013 | Armangau |
| 8,620,973 B1 | 12/2013 | Veeraswamy |
| 8,832,039 B1 | 9/2014 | Sorenson, III |
| 9,696,913 B1 | 7/2017 | Aron |

(Continued)

FOREIGN PATENT DOCUMENTS

| | | |
|---|---|---|
| GB | 2520043 | 5/2015 |
| WO | 2008144018 | 11/2008 |
| WO | 2016124959 | 8/2016 |

OTHER PUBLICATIONS

"Cloud Storage File Recoverability" by Christian A. Gorke et al., Proceedings of the Fifth ACM International Workshop on Security in Cloud Computing, Apr. 2017, pp. 19-26 (Year: 2017).*

(Continued)

*Primary Examiner* — Hasanul Mobin
(74) *Attorney, Agent, or Firm* — Van Pelt, Yi & James LLP

(57) ABSTRACT

A request for one or more files is received. It is determined that the requested one or more files have been archived at an archival storage tier. Access to a first portion of the one or more requested files stored at the archival storage tier is requested. Access is provided to the first portion in response to the request. Based at least in part on a metric associated with a utilization of the first portion, it is determined when to request access to a second portion of the one or more requested files stored at the archival storage tier.

19 Claims, 16 Drawing Sheets

(56) References Cited

U.S. PATENT DOCUMENTS

| | | |
|---|---|---|
| 9,836,355 B2 | 12/2017 | Pundir |
| 9,916,203 B1 | 3/2018 | Pogde |
| 10,049,121 B2 | 8/2018 | Bender |
| 10,073,969 B1 | 9/2018 | Faibish |
| 10,216,449 B1 | 2/2019 | Li |
| 10,409,769 B1 | 9/2019 | Malhotra |
| 10,572,386 B1* | 2/2020 | Gokhale ............... G06F 3/064 |
| 10,979,303 B1 | 4/2021 | Carr |
| 2003/0182253 A1 | 9/2003 | Chen |
| 2003/0182313 A1 | 9/2003 | Federwisch |
| 2004/0088382 A1 | 5/2004 | Therrien |
| 2004/0111420 A1 | 6/2004 | Hofstee |
| 2004/0168058 A1 | 8/2004 | Margolus |
| 2005/0125419 A1 | 6/2005 | Mizutani |
| 2005/0131917 A1 | 6/2005 | Auerbach |
| 2006/0074939 A1 | 4/2006 | Mazzagatti |
| 2006/0190469 A1 | 8/2006 | Kathuria |
| 2007/0005669 A1 | 1/2007 | Mueller |
| 2007/0226270 A1 | 9/2007 | Sarma |
| 2009/0265516 A1 | 10/2009 | Prabhu |
| 2009/0271412 A1 | 10/2009 | Lacapra |
| 2010/0030754 A1 | 2/2010 | Petruzzo |
| 2010/0179959 A1 | 7/2010 | Shoens |
| 2010/0191777 A1 | 7/2010 | Ylonen |
| 2010/0199036 A1 | 8/2010 | Siewert |
| 2010/0241827 A1 | 9/2010 | Yu |
| 2010/0257142 A1 | 10/2010 | Murphy |
| 2010/0274983 A1 | 10/2010 | Murphy |
| 2011/0099151 A1 | 4/2011 | Ylonen |
| 2012/0005233 A1 | 1/2012 | Matsumoto |
| 2012/0016976 A1 | 1/2012 | Voellmann |
| 2012/0246206 A1 | 9/2012 | Yamada |
| 2012/0296882 A1 | 11/2012 | Lee |
| 2012/0303929 A1 | 11/2012 | Chiu |
| 2012/0317079 A1 | 12/2012 | Shoens |
| 2013/0110790 A1 | 5/2013 | Matsumoto |
| 2013/0124814 A1 | 5/2013 | Carter |
| 2013/0312005 A1 | 11/2013 | Chiu |
| 2014/0006357 A1* | 1/2014 | Davis .................... G06F 3/067 707/667 |
| 2014/0040199 A1 | 2/2014 | Wojclech |
| 2014/0040205 A1 | 2/2014 | Maurilio |
| 2014/0188957 A1 | 7/2014 | Hosoi |
| 2014/0330787 A1 | 11/2014 | Modukuri |
| 2015/0058442 A1 | 2/2015 | Raskin |
| 2015/0127618 A1 | 5/2015 | Alberti |
| 2015/0193487 A1 | 7/2015 | Demidov |
| 2015/0269146 A1 | 9/2015 | Ayyar |
| 2015/0312243 A1 | 10/2015 | Ponsford |
| 2015/0356078 A1 | 12/2015 | Kishimoto |
| 2016/0034356 A1 | 2/2016 | Aron |
| 2016/0127336 A1 | 5/2016 | Cignetti |
| 2016/0210325 A1 | 7/2016 | Demidov |
| 2016/0224581 A1 | 8/2016 | Barry |
| 2016/0259694 A1 | 9/2016 | Huang |
| 2017/0052851 A1 | 2/2017 | Sudarsanam |
| 2017/0279875 A1* | 9/2017 | Gupta ................ H04L 67/1031 |
| 2017/0329533 A1* | 11/2017 | Agombar ............. G06F 3/0649 |
| 2017/0357646 A1 | 12/2017 | Ayyar |
| 2018/0063284 A1 | 3/2018 | Doar |
| 2018/0146037 A1* | 5/2018 | Figueroa ............ H04L 67/1097 |
| 2018/0239674 A1 | 8/2018 | Hutchison |
| 2018/0307736 A1 | 10/2018 | Balakrishnan |
| 2018/0373722 A1* | 12/2018 | Ulasen ................... G06N 3/045 |
| 2019/0095458 A1* | 3/2019 | Saradhi .................. G06F 16/13 |
| 2019/0182322 A1* | 6/2019 | Kumar ................... G06F 3/067 |
| 2019/0243559 A1* | 8/2019 | Raut ..................... G06F 3/0604 |
| 2019/0250819 A1* | 8/2019 | Jain ....................... G06F 3/061 |
| 2020/0285389 A1* | 9/2020 | Suarez ............... G06F 11/1448 |
| 2021/0303163 A1* | 9/2021 | Miyawaki ............. G06F 3/067 |
| 2021/0303406 A1 | 9/2021 | Malamut |
| 2022/0019553 A1* | 1/2022 | Dixith ................... G06F 16/164 |

OTHER PUBLICATIONS

Anonymous: "Zip and unzip files", Sep. 1, 2016, 04 Retrieved from the Internet: https://support.microsoft.com/en-us/help/14200/windows-compress-uncompress-zip-files.

Bill Nowicki: "NFS: Network File System Protocol Specification", Mar. 31, 1989 (Mar. 31, 1989), XP055511550, Retrieved from the Internet: URL:https://tools.ietf.org/pdf/rfc1094.pdf [retrieved on Oct. 2, 2018].

European search opinion for EP 18190316, dated Dec. 17, 2018 (Year 2018).

Juri Luca De Coi: "Usage of File Explorer with compressed folders on Windows 7", Dec. 2, 2019, Retrieved from the Internet: http://images.shoutwiki.com/jldecoi/5/5c/Compressed. folders. png.

Ogden et al. "Dat-Distributed Dataset Synchronization and Versioning." In: OSF Preprints. Apr. 2017. http://osf.io/nsv2c/f.

Ohad Rodeh, B-trees, Shadowing, and Clones, ACM Transactions on Storage, Feb. 29, 2008, pp. 1-27, vol. 3, No. 4.

PCT Written Opinion for PCT/US18/45973, dated Oct. 19, 2018 (Year: 2018).

Serialization/Deserialization of a Binary Tree, Sep. 29, 2010, LeetCode, retrieved from the Internet <URL: http://articles.leetcode.com/serializationdeserialization-of-binary/> (Year: 201 0).

WinSCP Community: "WinSCP documentation", Sep. 4, 2017 (Sep. 4, 2017), XP055511896, Retrieved from the Internet: URL:https://web.archive.org/web/20170717223120/https://winscp.net/eng/docs/start [retrieved on Oct. 2, 2018].

* cited by examiner

INCREMENTAL ACCESS REQUESTS FOR PORTIONS OF FILES FROM A CLOUD ARCHIVAL STORAGE TIER

CROSS REFERENCE TO OTHER APPLICATIONS

This application is a continuation of U.S. patent application Ser. No. 17/030,770 entitled INCREMENTAL ACCESS REQUESTS FOR PORTIONS OF FILES FROM A CLOUD ARCHIVAL STORAGE TIER filed Sep. 24, 2020 which is incorporated herein by reference for all purposes.

BACKGROUND OF THE INVENTION

A primary system includes one or more storage volumes that store file system data. The file system data is comprised of a plurality of content files and associated metadata. The primary system may perform a backup snapshot of the file system data to a storage system. The storage system may store the backed up file system data. At some point in time, the storage system may archive the backed up data to cloud storage.

A cloud storage provider may provide different tiers of storage. The cloud storage provider may charge a user different premiums based on the storage tier in which the user's data is stored, the amount of data stored in a particular storage tier, the length of time in which data is stored in a particular storage tier, etc. A user may request the storage provider to restore data to a primary system associated with the customer. However, the requested data may be stored at a cloud storage. The amount of time to restore the data from the cloud storage depends on a storage class storing the requested data. A storage class may refer to a hot storage tier, a cold storage tier, an archival storage tier, etc. The amount of time needed to restore a set of data from a cold storage tier may be longer than the amount of time needed to restore the set of data from a hot storage tier. The performance of the hot storage tier is faster than other storage tiers and may be used for frequently accessed data.

Restoring the set of data to the cloud storage to the primary system may require changing a storage class associated with the set of data from the cold storage tier of the cloud storage to a hot storage tier of the cloud storage, and then restoring the set of data to the primary system from the hot storage tier of the cloud storage to reduce the amount of time needed to restore the set of data. Changing a storage class associated with the set of data may include moving the set of data from the cold storage tier of the cloud storage to the hot storage tier of the cloud storage, copying the set of data from the cold storage tier of the cloud storage to the hot storage tier of the cloud storage, or updating metadata associated with the set of data to indicate a storage class for the set of data has changed from the cold storage tier of the cloud storage to the hot storage tier of the cloud storage.

However, there may be additional network, computing, and/or monetary costs associated with assigning the set of data to a storage class that corresponds to the hot storage tier while the set of data is being restored to the primary system. The additional network, computing, and/or monetary costs may be incurred when a size of the set of data exceeds a storage threshold associated with the hot storage tier (e.g., 10 GB). The storage threshold may be specified by an owner associated with the set of data, a storage provider, and/or a cloud storage provider.

BRIEF DESCRIPTION OF THE DRAWINGS

Various embodiments of the invention are disclosed in the following detailed description and the accompanying drawings.

DETAILED DESCRIPTION

Figure 1:
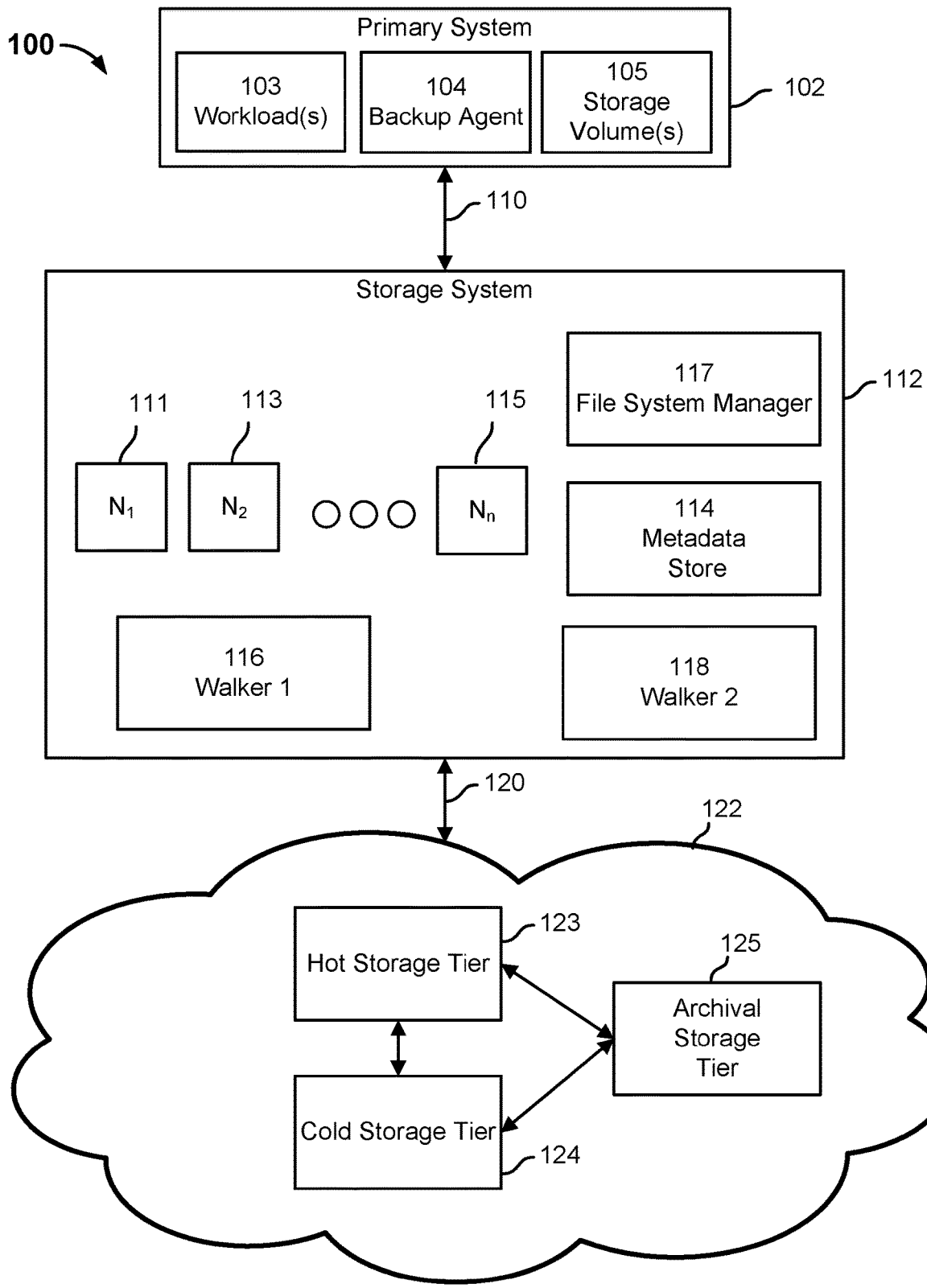
FIG. 1 is a block diagram illustrating an embodiment of a system for restoring data from a cloud archival storage tier in accordance with some embodiments.

Techniques disclosed herein enable a user associated with a primary system to take advantage of the performance benefits of restoring one or more archived files from a hot storage tier of the cloud storage to the primary system without incurring additional network, computing, and/or monetary costs by exceeding a storage threshold associated with the hot storage tier of the cloud storage.

A primary system includes a storage volume that stores file system data. A backup snapshot (e.g., full backup snapshot or incremental backup snapshot) of the file system data may be backed up to a storage system. The storage system may store the file system data and organize the file system data using an index. The index may be a tree data structure (e.g., a snapshot tree). Each time a backup snapshot is performed, the storage system may generate or update the index to indicate the one or more files that were included in the backup snapshot and storage location(s) for the data associated with the one or more files that were included in the backup snapshot. The index may associate a file identifier for a file with a storage location. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file.

At some point in time, the storage system may archive to an archival storage tier of a cloud storage some of the files that were backed up to storage system. In some embodiments, data associated with some of the files that were included in a backup snapshot is archived to the archival storage tier. In some embodiments, all of the data associated with a backup snapshot (e.g., full backup snapshot or incremental backup snapshot) is archived to the archival storage tier. An entity associated with the primary system may desire to retain less frequently accessed files for one or more reasons (e.g., legal compliance), but reduce the overall costs associated with retaining the one or more files by archiving data associated with the one or more files to the archival storage tier of the cloud storage.

The storage system may serialize the data associated with the files into a serialized data file that includes a flat set of data prior to archiving the files to the archival storage tier. The flat set of data includes a plurality of data blocks where each data block of the flat set of data corresponds to a node of the tree data structure (e.g., a node of a snapshot tree). A block that corresponds to a root node or intermediate node of the tree data structure includes a file offset to another data block of a flat set of data. A serialized data file enables the storage system to restore one or more files included in the serialized data file without having to reconstruct an entire tree data structure associated with the one or more files.

An archival storage tier of the cloud storage stores one or more serialized data files. The cloud storage includes a plurality of storage tiers, each of the storage tiers has an associated restoration path, associated speed, and associated cost. A restoration path for a file stored in a hot storage tier of the cloud storage may include directly restoring the data associated with the file from the hot storage tier to a primary system, but a restoration path for a file stored in an archival storage tier of the cloud storage may not include directly restoring data associated with the file from the archival storage tier of the cloud storage to the primary system. Instead, the restoration path for the file stored in the archival storage tier of the cloud storage may include changing a storage class associated with the file stored in the archival storage tier from the archival storage tier to the hot storage tier and then restoring the data associated with the file from the hot storage tier to the primary system. A cost associated with storing the one or more serialized data files in the archival storage tier may be less than storing the one or more serialized data files in a different storage tier of the cloud storage. The one or more serialized data files may be stored at the archival storage tier of the cloud storage to reduce the overall costs associated with storing the one or more serialized data files.

A user associated with a primary system may send to a storage system a request to restore one or more files to the primary system. In response to receiving the request, the storage system may determine a storage location for the one or more requested files by inspecting the index that associates data associated with the files with their current storage location. In some embodiments, a current storage location for data associated with one or more requested files is the storage system and the storage system restores the data associated with the one or more requested files to the primary system.

In some embodiments, a current storage location for the data associated with one or more requested files is an archival storage tier of the cloud storage. The storage system may use the index to identify the one or more serialized data files that include the data associated with the one or more requested files (e.g., metadata and content data). Each of the one or more requested files is associated with a corresponding file identifier. The storage system may traverse the index based on a file identifier associated with a requested file to identify the one or more serialized data files that correspond to the requested file. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file. The storage system may request from a cloud storage provider access to a first portion of the one or more requested files stored at the archival storage tier of the cloud storage. In response to the request, the cloud storage provider may change a storage class associated with the first portion of the one or more requested files stored at the archival storage tier of the cloud storage to the hot storage tier of the cloud storage.

A size of data corresponding to the first portion of the one or more requested files may be less than or equal to a storage threshold associated with the hot storage tier of the cloud storage. In some embodiments, the first portion of the one or more requested files includes all of the data associated with the one or more requested files. In some embodiments, the first portion of the one or more requested files includes some of the data associated with one of the one or more requested files. In some embodiments, the first portion of the one or more requested files includes all of the data with at least one of the one or more requested files and some of the data associated with other files included in the request.

The storage system may include a first walker that is configured to monitor the hot storage tier of the cloud storage. The first walker may monitor the rate at which a storage class for data associated with a requested file is being changed from the archival storage tier of the cloud storage to the hot storage tier of the cloud storage. After a storage class for the first portion of the one or more requested files has been changed from the archival storage tier of the cloud storage to the hot storage tier of the cloud storage, the first walker may provide to a second walker of the storage system an indication to restore from the hot storage tier of the cloud storage to the primary system the data associated with the first portion of the one or more requested files. In some embodiments, after a storage class for some of the first portion of the one or more requested files has changed from the archival storage tier of the cloud storage to the hot storage tier of the cloud storage, the first walker may provide to a second walker of the storage system an indication to restore from the hot storage tier of the cloud storage to the primary system the data associated with the first portion of the one or more requested files.

In response to receiving the indication from the first walker, the second walker is configured to start a process of restoring the one or more requested files from the hot storage tier of the cloud storage to the primary system. Restoring the first portion of the one or more requested files stored at the hot storage tier of the cloud storage includes reconstructing a portion of a tree data structure corresponding to the one or more requested files based on one or more serialized data files stored in the hot storage tier of the cloud storage. The data of the one or more requested files is stored in a plurality of objects at the cloud storage. The portion of the tree data structure corresponding to the one or more requested files needs to be restored to reconstruct the one or more requested files. The one or more requested files would be inoperable at the primary system if the one or more requested files were restored directly from the cloud storage to the primary system without reconstructing the portion of the tree data structure corresponding to the one or more requested files because the one or more requested files would be in a format that the primary system does not understand without additional software or processes. The second walker is configured to restore the plurality of objects to the primary system such that the one or more restored files are operable at the primary system.

A complete tree data structure includes a root node, one or more levels of intermediate nodes, and a plurality of leaf nodes. The complete tree data structure corresponds to a backup snapshot and includes metadata for one or more requested files and metadata for one or more non-requested files. The reconstructed portion of the tree data structure corresponding to the one or more requested files includes metadata for the one or more requested files and stub nodes for the one or more non-requested files.

The tree data structure reconstructed by the second walker initially includes a root node and references to one or more stub nodes. A stub node is a placeholder for an actual node of a tree data structure. The stub node includes a reference to a data block of a serialized flat set of data. The second walker may reconstruct the portion of a tree data structure corresponding to the one or more requested files by reading one or more serialized data files and updating the tree data structure by replacing a stub node with an actual node of the tree data structure that is associated with one of the one or more requested files.

The second walker may traverse the partially restored tree data structure from a root node of the partially restored tree data structure to a leaf node of the partially restored tree data structure and update the partially restored tree data structure to include metadata for the one or more requested files. A leaf node of the partially restored tree data structure may indicate a storage location for one or more data chunks associated with a requested file. For example, the storage location may be a storage location at the hot storage tier of the cloud storage. After the second walker has updated the partially restored tree data structure, the second walker may restore the data associated with the one or more requested files from the hot storage tier of the cloud storage to the primary system.

While the second walker is restoring the one or more requested files from the hot storage tier of the cloud storage to the primary system, the first walker may monitor a rate at which the second walker is performing the restoration. In some embodiments, the first walker may request a cloud service provider to change a storage class for data associated with a file stored at the hot storage tier of the cloud storage (e.g., change the storage class from the hot storage tier of the cloud storage back to an archival storage tier of the cloud storage) after the second walker has restored the data associated with a file from the hot storage tier of the cloud storage to the primary system. The first walker may determine a metric associated with a utilization of the first portion. The determined metric associated with the utilization of the first portion may be based on the rate at which the cloud storage provider is able to change a storage class for data associated with a requested file from the archival storage tier of the cloud storage to the hot storage tier of the cloud storage and/or the rate at which the second walker is able to restore data from the hot storage tier of the cloud storage to the primary system (e.g., transfer rate, throughput rate, etc.). The first walker may use the determined metric to determine when to provide to the cloud storage provider an instruction to change a storage class for an additional portion of the one or more requested files (e.g., $2^{nd}$ portion, $3^{rd}$ portion, . . . , nth portion) from the archival storage tier of the cloud storage to the hot storage tier of the cloud storage. A size of data, a quality of service, a priority of a request, and a timing of a request associated with the additional portion of the one or more requested files may be based on the determined metric such that the storage threshold associated with the hot storage tier is not exceeded.

The second walker may continue to restore any data that is stored in the hot storage tier of the cloud storage to the primary system. In the event there isn't any data stored in the hot storage tier of the cloud storage because the second walker is able to restore data from the hot storage tier of the cloud storage to the primary system faster than the cloud service provider is able to change a storage class for data from an archival storage tier of the cloud storage to the hot storage tier of the cloud storage, the second walker may continuously or periodically re-attempt to restore data until the cloud service provider is able to change a storage class for data associated with an additional portion of the one or more requested files from the archival storage tier of the cloud storage to the hot storage tier of the cloud storage.

The first walker may dynamically adjust (e.g., increase or decrease) the amount of data that is to be included in each additional portion, a quality of service, a priority of a request, and a timing of a request based on the determined metric to reduce the likelihood that the entity associated with the primary system will incur additional network, computing, and/or computing costs by storing data at the hot storage tier of the cloud storage that exceeds a storage threshold associated with the hot storage tier. The first walker also attempts to optimize a time when an instruction to change a storage class for a portion of the one or more requested files from the archival storage tier to the hot storage tier of the cloud storage is provided to the cloud storage to minimize the amount of downtime of the second walker in restoring the one or more requested files. This reduces the total amount of time needed to restore the one or more requested files.

FIG. 1 is a block diagram illustrating an embodiment of a system for restoring data from a cloud archival storage tier in accordance with some embodiments. In the example shown, system 100 includes a primary system 102, a storage system 112, and a cloud storage 122. Primary system 102 is coupled to storage system 112 via connection 110. Storage system 112 is coupled to cloud storage 122 via connection 120.

Primary system 102 is a computing system that stores file system data. The file system data may include a plurality of files (e.g., content files, text files, etc.) and metadata associated with the plurality of files (e.g., creation time, owner, modification time, file size, etc.). Primary system 102 may be comprised of one or more servers, one or more computing devices, one or more storage devices, and/or a combination thereof. Primary system 102 may be configured to send a backup snapshot of file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102.

Primary system 102 may be configured to run one or more workloads 103. Examples of workloads include, but are not limited to, a virtual machine, a database, an application, a container, a pod, etc. Primary system 102 may include one or more storage volumes 105 that are configured to store file system data associated with primary system 102. The file system data associated with primary system 102 includes the data associated with the one or more workloads.

Backup agent 104 may be configured to cause primary system 102 to perform a backup snapshot (e.g., a full backup snapshot or incremental backup snapshot). A full backup snapshot may include all of the file system data of primary system 102 at a particular moment in time. In some embodiments, a full backup snapshot for a particular workload of the one or more workloads 103 is performed and the full backup snapshot of the particular workload includes all of the workload data associated with the particular workload at a particular moment in time. In some embodiments, backup agent 104 is running on primary system 102. In some embodiments, backup agent 104 is running in one of the one or more workloads 103. In some embodiments, a backup agent 104 is running on primary system 102 and a separate backup agent 104 is running in one of the one or more workloads 103. In some embodiments, a workload includes a backup function and is configured to perform a backup snapshot on its own without backup agent 104. In some embodiments, primary system 102 includes a backup function and is configured to perform a backup snapshot on its own without backup agent 104. In some embodiments, storage system 112 may provide instructions to primary system 102, causing primary system 102 to execute backup functions without backup agent 104.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and configured to store the data associated with the backup snapshot across the storage cluster.

In some embodiments, storage system 112 is configured to ingest a backup snapshot received from primary system 102 and archive the data associated with one or more files included in the backup snapshot. Archiving the data associated with the one or more files included in the backup snapshot may include serializing the data associated with the one or more files to be archived, storing the serialized data associated with the one or more files at archival storage tier 125, generating a tree data structure corresponding to the backup snapshot where some of the nodes included in the tree data structure indicate a cloud storage location for the one or more archived files, serializing the tree data structure, and storing the serialized tree data structure at the archival storage tier 125.

Storage system 112 may be a cloud instantiation of a storage system. A configuration of a cloud instantiation of storage system 112 may be a virtual replica of storage system 112. For example, storage system 112 may be comprised of three storage nodes, each storage node with a storage capacity of 10 TB. A cloud instantiation of storage system 112 may be comprised of three virtual nodes, each virtual node with a storage capacity of 10 TB. In other embodiments, a cloud instantiation of storage system 112 may have more storage capacity than storage system 112. In other embodiments, a cloud instantiation of storage system 112 may have less storage capacity than storage system 112.

Storage system 112 may receive and ingest the file system data associated with a backup snapshot. Storage system 112 may include a file system manager 117 that is configured to organize the file system data of the backup snapshot using an index. The index may be a tree data structure. An example of the tree data structure is a snapshot tree, which may be based on a B+ tree structure (or other type of tree structure in other embodiments). Storage system 112 may store a plurality of tree data structures in metadata store 114. Storage system 112 may generate a snapshot tree and one or more file metadata structures for each backup snapshot.

In the event the backup snapshot corresponds to a full backup of primary system 102, a view corresponding to the backup snapshot may be comprised of a snapshot tree and one or more file metadata structures. The snapshot tree may be configured to store the file system metadata associated with primary system 102. A file metadata structure may be configured to store the metadata associated with one of the files stored on primary system 102. Each of the files included in a backup snapshot may have a corresponding file metadata structure.

In the event the backup snapshot corresponds to a full backup of one of the one or more workloads 103, a view corresponding to the backup snapshot may be comprised of a snapshot tree and one or more file metadata structures. The snapshot tree may be configured to store the metadata associated with one of the one or more workloads 103. A file metadata structure may be configured to store the metadata associated with a workload file included in the workload.

The tree data structure may be used to capture different views of data. A view of data may correspond to a full backup snapshot, an incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of a primary system, a workload, or data generated on or by the storage system at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with primary system 102, a workload at a particular time and the file's contents, or a file generated on or by the storage system, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., workload metadata structure or a workload file metadata structure), a pointer to a data chunk stored on the storage cluster, a reference to an archival storage location, etc.

A file metadata structure may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of a workload, a workload file, or a file to be linked together by allowing a node of a later version of a file metadata structure to reference a node of a previous version of a file metadata structure. The file metadata structure is configured to store metadata associated with a file or a workload that enables the data chunks associated with the file or workload to be located.

A leaf node of a file metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

File system manager 117 may generate or update an index each time a backup snapshot is performed. The index may identify the one or more files that were included in the backup and indicate a storage location for the one or more files. As discussed above, the index may be a tree data structure (e.g., a snapshot tree). A node of the tree data structure, such as a leaf node, may store a file identifier that corresponds to the file. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file. The node of the tree data structure may also store a corresponding storage location for the file. In some embodiments, the storage location for the file is associated with storage system 112. In some embodiments, the storage location for the file is associated with cloud environment 122. A cloud provider associated with cloud environment 122 may store data associated with the file in one or more buckets. An example of a storage location for "file 1" is "bucket1/file1." The storage location for "file 1" may be associated with a storage class, such as hot storage tier 123, cold storage tier 124, or archival storage tier 125. An archival storage tier, such as archival storage tier 125, is a storage tier in which data associated with one or more files cannot be directly restored from the archival storage tier to a system, such as storage system 112 or primary system 102. Instead, a cloud service provider associated with the archival storage tier may require the storage class for data associated with one or more files be changed to a different storage tier, such as hot storage tier 123 or cold storage tier 124, before the one or more files are restored to a system, such as storage system 112 or primary system 102. A QoS associated with archival storage tier 125 may be worse than hot storage tier 123 or cold storage tier 124.

File system manager 117 may archive some or all of the file system data associated with a backup snapshot to archival storage tier 125. For example, a snapshot tree and its associated file metadata structure(s) may be archived to archival storage tier 125. In some embodiments, one or more file metadata structures are archived to archival storage tier 125, but the snapshot tree associated with the one or more archived file metadata structures remains on storage system 112.

File system manager 117 may determine whether to archive some or all of the file system data associated with a backup snapshot to archival storage tier 125 based on an archive policy. An archive policy may indicate that a full snapshot archive, an incremental snapshot archive, a full file snapshot archive, or an incremental file snapshot archive is to be performed. A full snapshot archive includes a complete view of a snapshot tree and its associated file metadata structure(s) at a particular moment in time. An incremental snapshot archive includes a partial view of a snapshot tree and its associated file metadata structure(s) at a particular moment in time. The incremental snapshot archive includes a representation of the one or more nodes that were not included in a previous archive. A full file snapshot archive includes the metadata and data associated with a file that is to be archived. An incremental file snapshot archive includes metadata and data associated with the file that has not been previously archived.

The archive policy may indicate the frequency at which a type of archive (e.g., full snapshot archive, incremental snapshot archive, file archive, etc.) is to be performed. The archive policy may indicate that a particular type of archive may be performed in response to a command (e.g., user instruction, archive algorithm, etc.).

File system manager 117 may archive some or all of the file system data associated with a backup snapshot using a serialized data file. The serialized data file includes a flat set of data comprised of a plurality of data blocks where each data block of the flat set of data corresponds to a node of a tree data structure. A data block that corresponds to a root node or intermediate node of the tree data structure includes a file offset to another data block of a flat set of data. A data block that corresponds to a leaf node includes a reference to a storage location for one or more data chunks with which the leaf node is associated. File system manager 117 may update the index to indicate a storage location for each of the one or more files that is archived to archive storage 125. A node of the index that corresponds to an archived file may be updated to include a corresponding link to a storage location for a file of the one or more files that is archived to archive storage 125 (e.g., a link to "bucket1/file1"). In some embodiments, a file is comprised of a plurality of objects. The node of the index may be updated to include corresponding links for each of the plurality of objects of the file that are stored at archive storage 125.

A user associated with primary system 102 may send to storage system 112 a request to restore one or more files to primary system 102. In response to receiving the request, file system manager 117 may determine a storage location for data associated with the one or more requested files by inspecting the index that associates files with their current storage location. In some embodiments, the data associated with one or more requested files is stored at storage system 112 and in response to the request, storage system 112 restores the data associated with the one or more requested files from storage system 112 to primary system 102.

In some embodiments, the data associated with one or more requested files is stored at archival storage tier 125. File system manager 117 may use the index to identify the one or more serialized data files that include the data associated with the one or more requested files (e.g., metadata and content data). Each of the one or more requested files is associated with a corresponding file identifier. The storage system may traverse the index based on a file identifier associated with a requested file to identify the one or more serialized data files that correspond to the requested file. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file. An entity associated with primary system 102 may have purchased a particular amount of storage capacity (e.g., 10 GB) for hot storage tier 123. Hot storage tier 123 may be used for frequently accessed data. File system manager 117 may request from a cloud storage provider associated with cloud storage 122 access to a first portion of the one or more requested files stored at archival storage tier 125. In response to the request, the cloud storage provider may change a storage class associated with the first portion of the one or more requested files stored at archival storage tier 125 to hot storage tier 123. Changing a storage class associated with the first portion of the one or more requested files may include moving the set of data from the archival storage tier 125 to hot storage tier 123, copying the data associated with the first portion from archival storage tier 125 to hot storage tier 123, or updating metadata associated with the first portion of the one or more requested files to indicate a storage class for the first portion has changed from archival storage tier 125 to hot storage tier 123. In some embodiments, the first portion excludes data that is already stored at hot storage tier 123 (e.g., deduplicated data).

A size of data corresponding to the first portion of the one or more requested files may correspond to a threshold associated with a hot storage tier of cloud storage (e.g., 10 GB). In some embodiments, the first portion of the one or more requested files includes all of the data associated with the one or more requested files. In some embodiments, the first portion of the one or more requested files includes some of the data associated with one of the one or more requested files. In some embodiments, the first portion of the one or more requested files includes all of the data with at least one of the one or more requested files and some of the data associated with other files included in the request.

Storage system 112 includes a walker 116 that is configured to monitor hot storage tier 123. Walker 116 may monitor the rate at which a storage class for data associated with a requested file is being changed from archival storage tier 125 to hot storage tier 123. After a storage class for the first portion of the one or more requested files has been changed from archival storage tier 125 to hot storage tier 123, walker 116 may provide to walker 118 an indication to restore the data associated with the first portion of the one or more requested files from hot storage tier 123 to the one or more storage volumes 105 of primary system 102. In some embodiments, in addition to walkers 116, 118, one or more additional walkers are used to restore the one or more requested files to primary system 102. In some embodiments, the one or more additional walkers are pairs of additional walkers.

In response to receiving the indication from walker 116, walker 118 is configured to start a process of restoring the data associated with the one or more requested files stored at hot storage tier 123. Restoring the first portion of the one or more requested files stored at hot storage tier 123 includes reconstructing a portion of a tree data structure corresponding to the one or more requested files based on one or more serialized data files. For example, part of a snapshot tree and the one or more file metadata structures corresponding to the one or more requested files may be reconstructed.

A complete tree data structure includes all of the nodes associated with a snapshot tree and all of the nodes associated with the one or more file metadata structures. The complete tree data structure includes metadata for the one or more requested files and metadata for one or more non-requested files. The reconstructed portion of the tree data structure corresponding to the one or more requested files includes metadata for the one or more requested files and stub nodes for the one or more non-requested files. The metadata for the one or more requested files includes nodes of the snapshot tree needed to traverse the snapshot tree to file metadata structure(s) associated with the one or more requested files and the nodes of the file metadata structure(s) associated with the one or more requested files.

The tree data structure reconstructed by walker 118 initially includes a root node and references to one or more stub nodes. A stub node is a placeholder for an actual node of the tree data structure. The stub node includes a reference to a data block of a serialized data file. Walker 118 may reconstruct the portion of the tree data structure corresponding to the one or more requested files by reading one or more serialized data files and updating the tree data structure by replacing a stub node with an actual node of the tree data structure that is associated with one of the one or more requested files.

Walker 118 may traverse the partially restored tree data structure from a root node of the partially restored tree data structure to a leaf node of the partially restored tree data structure and update the partially restored tree data structure to include metadata for the one or more requested files. A leaf node of the partially restored tree data structure indicates a storage location for one or more data chunks associated with a requested file. An example of a storage location for "file 1" is "bucket1/file1." After walker 118 has updated the partially restored tree data structure, walker 118 may restore the data associated with the one or more requested files from hot storage tier 123 to primary system 102.

While walker 118 is restoring the one or more requested files from hot storage tier 123 to primary system 102, walker 116 may monitor a rate at which walker 118 is performing the restoration. In some embodiments, walker 116 may request a cloud service provider associated with cloud storage 122 to change a storage class for the data associated with a file stored at hot storage tier 123 after walker 118 has restored the data associated with a file from hot storage tier 123 to primary system 102. For example, changing a storage class for the data associated with a file stored at hot storage tier 123 may include moving the data associated with the file back to archival storage tier 125 from hot storage tier 123, deleting the data associated with the file from hot storage tier 123, or updating metadata associated with the file to indicate a storage class for the file has changed from hot storage tier 123 to archival storage tier.

Walker 116 may determine a metric associated with a utilization of the first portion. The determined metric associated with the utilization of the first portion may be based on the rate at which the cloud storage provider associated with cloud storage 122 is able to change a storage class for data associated with a requested file from archival storage tier 125 to hot storage tier 123 and/or the rate at which walker 118 is able to restore data from hot storage tier 123 to primary system 102. Walker 116 may use the determined metric to determine when to provide to the cloud storage provider associated with cloud storage 122 an instruction to change a storage class associated with an additional portion of the one or more requested files (e.g., $2^{nd}$ portion, $3^{rd}$ portion, . . . , nth portion) from archival storage tier 125 to hot storage tier 123. A size of data, a quality of service, a priority of a request, etc. may also be based on the determined metric such that the storage threshold associated with the hot storage tier is not exceeded. In some embodiments, the additional portion excludes data that is already stored at hot storage tier 123 (e.g., deduplicated data).

Walker 118 may continue to restore any data that is stored in hot storage tier 123 to primary system 102. Walker 116 may dynamically adjust (e.g., increase or decrease) the amount of data that is to be included in each additional portion, a quality of service, a priority of a request, and a timing of a request based on the determined metric to reduce the likelihood that the entity associated with primary system 102 will incur additional network, computing, and/or monetary costs by storing data at hot storage tier 123 that exceeds a storage threshold associated with hot storage tier 123. Walker 116 also attempts to optimize the timing, the size, and any other parameters (e.g., QoS) associated with changing a storage class for an additional portion of the one or more requested files from archival storage tier 125 to hot storage tier 123 to minimize the amount of downtime of walker 118 in restoring the one or more requested files. This reduces the total amount of time needed to restore the one or more requested files.

In some embodiments, a restoration process associated with the one or more requested files is canceled. Instead of charging a user for changing a storage class for data associated with all of the one or more requested files, the user may be charged for data associated with the portions of the one or more requested files that have changed a storage class from archival storage tier 125 to hot storage tier 123.

Figure 2:
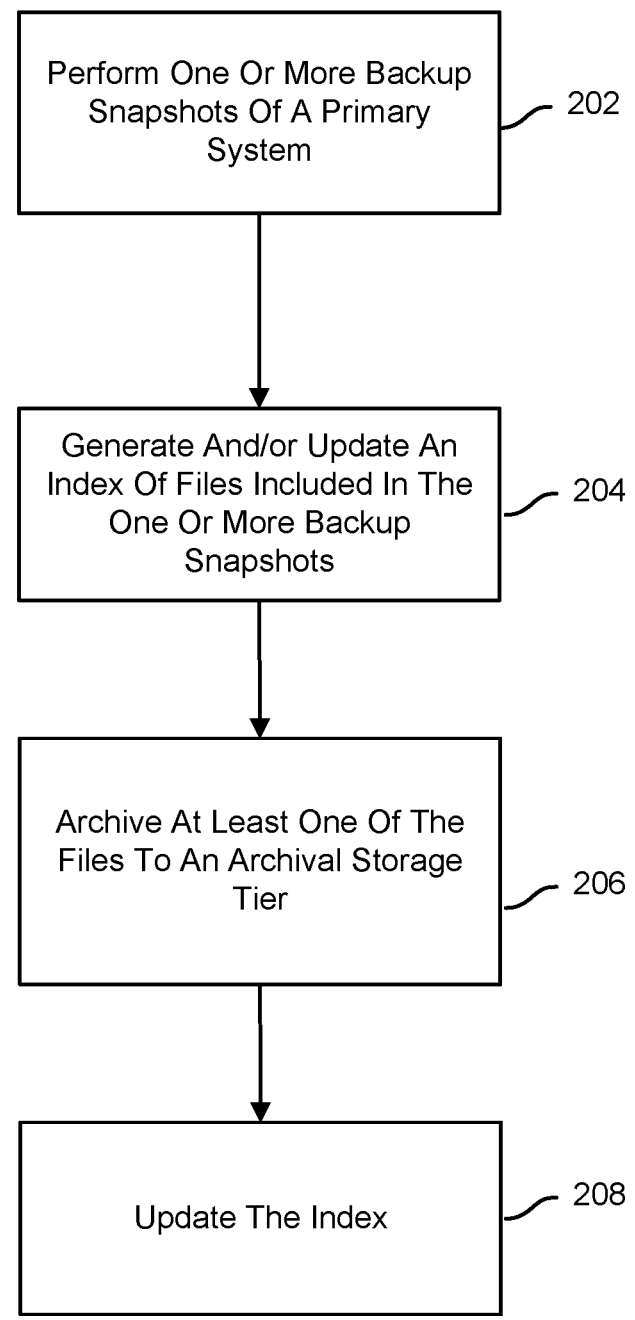
FIG. 2 is a flow diagram illustrating a process of maintaining an index in accordance with some embodiments.

FIG. 2 is a flow diagram illustrating a process of maintaining an index in accordance with some embodiments. In the example shown, process 200 may be implemented by a storage system, such as storage system 112.

At 202, one or more backup snapshots of a primary system are performed. A storage system may receive file system data associated with a backup snapshot. The storage system may generate a corresponding snapshot tree and one or more corresponding file metadata structures for each of the one or more backup snapshots.

At 204, an index of files included in the one or more backup snapshots is generated and/or updated. A backup snapshot includes data associated with one or more files. An index is generated the first time a backup snapshot is performed. The index may be a tree data structure (e.g., a snapshot tree). Each time a backup snapshot is performed, the storage system may generate or update the index to indicate the one or more files that were included in the backup snapshot and storage location(s) for the data associated with the one or more files that were included in the backup snapshot. The index may associate a file identifier for a file with a storage location. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file. The index may indicate a storage location for the data chunks associated with a file.

The index is updated each time an additional backup snapshot is performed. The index may be updated to include one or more new files that were added to a primary system after a previous backup snapshot. The index may be updated to include a newer version of a file that was previously included in the index. The index may also indicate the storage locations for the data chunks associated with the newer version of the file. For example, a first version of a file may be stored at a first storage location of the storage system. A second version of the file may include the data included in the first version of the file and additional data. The index may associate the new version of the file with the first storage location of the storage system and the storage location of the storage system for the additional data.

At 206, at least one of the files is archived to an archival storage tier. A file may be archived to the archival storage tier when a full snapshot archive, an incremental snapshot archive, a full file snapshot archive, or an incremental file snapshot archive is performed.

A full snapshot archive includes a complete view of a snapshot tree and its associated file metadata structure(s) at a particular moment in time. A file metadata structure corresponds to a version of a file. A serialized data file corresponding to the full snapshot archive is stored at the archival storage tier.

An incremental snapshot archive includes a partial view of a snapshot tree and its associated file metadata structure(s) at a particular moment in time. The incremental snapshot archive includes a representation of the one or more nodes that were not included in a previous archive. A serialized data file corresponding to the incremental snapshot archive is stored at the archival storage tier. A file metadata structure may correspond to a newer version of a file. The incremental snapshot archive may include portions of a file that were not previously archived (e.g., portions of the file that were included in an incremental backup snapshot), but include references to the portions of the file that were previously archived (e.g., portions of the file that were included in a full backup snapshot or a previous incremental backup snapshot).

A full file snapshot archive includes a complete view of a content file at a particular moment in time. The full file snapshot archive is a serialized data file that includes data blocks that correspond to the nodes of a file metadata structure needed to be traversed to determine a storage location of all the data chunks associated with the content file.

An incremental file snapshot archive includes a partial view of a content file at a particular moment in time. The incremental file snapshot archive is a serialized data file that includes data blocks that correspond to the nodes of a tree data structure needed to be traversed to determine a storage location of data chunks associated with the content file that were not previously archived.

At 208, the index is updated. For the one or more files that are archived to the archival storage tier, the index is updated to indicate a storage location of the one or more archived files at the archival storage tier. For example, a node of the index that corresponds to a first file may be updated to include a link to a cloud storage location that corresponds to the first file. An example of a cloud storage location for "file 1" is "bucket1/file1," which corresponds to one of the storage classes associated with a cloud storage provider.

Portions of a file may be stored across a plurality of serialized data files. The index may be updated to indicate the storage locations for each of the plurality of serialized data files associated with a file.

Figure 3:
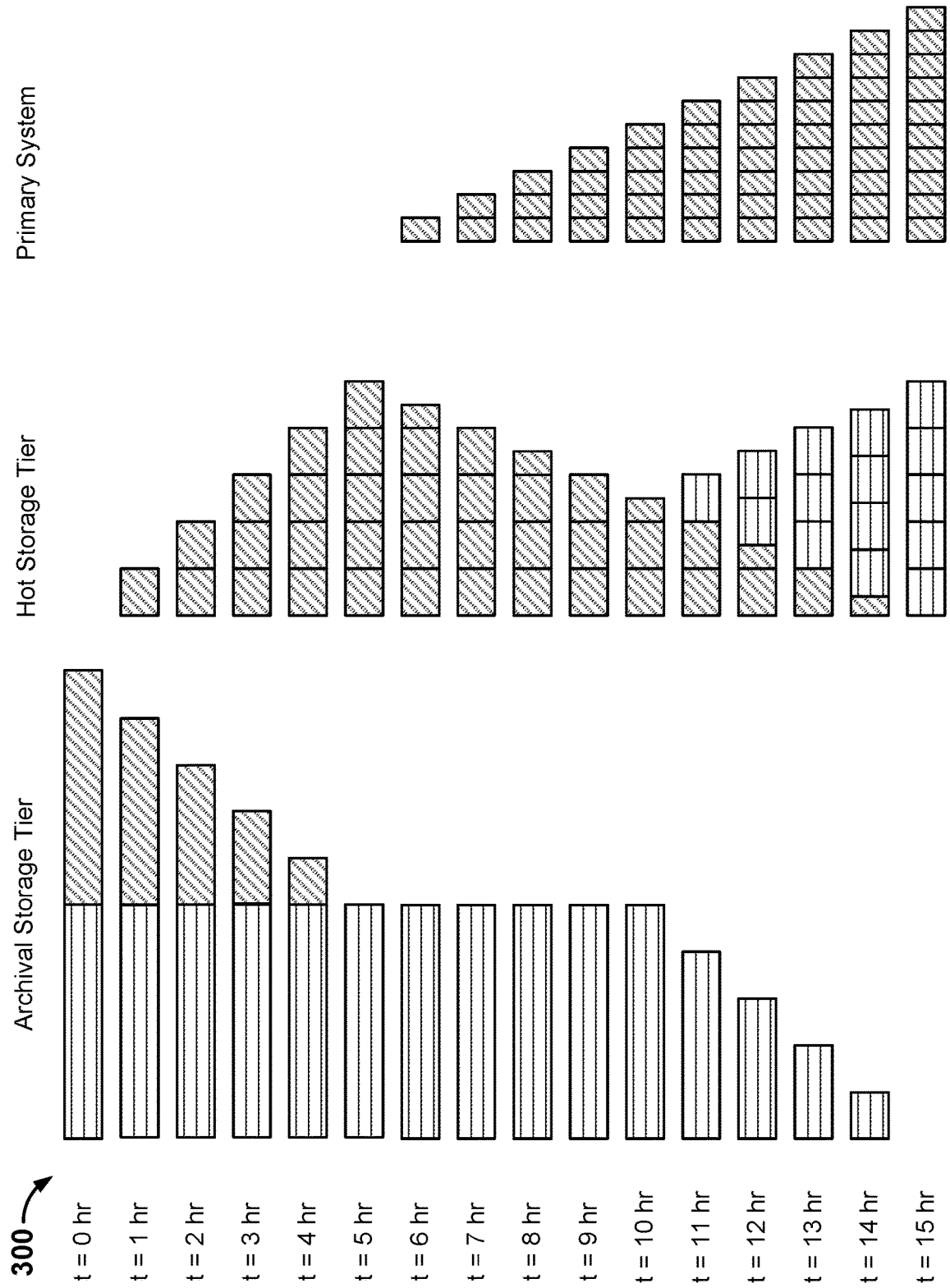
FIG. 3 is a diagram illustrating a timeline for restoring one or more files in accordance with some embodiments.

FIG. 3 is a diagram illustrating a timeline for restoring one or more files in accordance with some embodiments. In the example timeline 300, at t=0 hr, one or more files are stored at an archival storage tier, such as archival storage tier 125. A storage system, such as storage system 112, may receive a request to restore the one or more files, which are stored at an archival storage tier of a cloud storage. In this example, the data associated with the one or more files has a size of 20 GB and a storage threshold associated with a hot storage tier of a cloud storage is 10 GB.

As discussed above, the amount of time to restore the data from the cloud storage depends on the restoration path associated with the requested data. A restoration path for a file stored in a hot storage tier of the cloud storage may include directly restoring the data associated with the file from the hot storage tier to a primary system, but a restoration path for a file stored in an archival storage tier of the cloud storage may not include directly restoring data associated with the file from the archival storage tier of the cloud storage to the primary system. Instead, the restoration path for the file stored in the archival storage tier of the cloud storage may include changing a storage class associated with the file stored in the archival storage tier from the archival storage tier to the hot storage tier and then restoring the data associated with the file from the hot storage tier to the primary system.

Changing a storage class for all of the data associated with the one or more requested files from the archival storage tier to the hot storage tier in response to a single request may cause an entity associated with the primary system to incur additional network, computing, and monetary costs charged by the cloud storage provider for storing the all of the data associated with the one or more requested files at the hot storage tier because the storage threshold associated with a hot storage tier of a cloud storage has been exceeded. These additional network, computing, and monetary costs may be prevented by segmenting the data associated with the one or more requested files into a plurality of portions such that the storage threshold associated with the hot storage tier of a cloud storage is not exceeded. This may enable the entity associated with the primary storage system to take advantage of the speed associated with the hot storage tier without incurring additional network, computing, and monetary costs.

In the example shown, at t=0 hr, a request to restore one or more files to a primary system is received. The one or more requested files are stored at an archival storage tier. The data associated with the one or more files is segmented into two portions. From t=0 hr to t=1 hr, the cloud storage provider is able to change a storage class for 2 GB of data from the archival storage tier to the hot storage tier. From t=1 hr to t=2 hr, the cloud storage provider is able to change a storage class for 2 GB of data from the archival storage tier to the hot storage tier. From t=2 hr to t=3 hr, the cloud storage provider is able to change a storage class for 2 GB of data from the archival storage tier to the hot storage tier. From t=3 hr to t=4 hr, the cloud storage provider is able to change a storage class for 2 GB of data from the archival storage tier to the hot storage tier. From t=4 hr to t=5 hr, the cloud storage provider is able to change a storage class for 2 GB of data from the archival storage tier to the hot storage tier. At t=5 hr, 10 GB of data associated with the one or more requested files is stored at the hot storage tier of the storage system, which is the amount of storage capacity of the hot storage tier allocated to an entity associated with the primary system.

A first walker associated with a storage system monitors the hot storage tier. The first walker may determine that the cloud storage provider is able to change a storage class for data from the archival storage tier to the hot storage tier at a rate of 2 GB/hr. Although the example depicts the cloud storage provider being able to change a storage class for data at a constant rate of 2 GB/hr, the rate at which the cloud storage provider is able to change a storage class for data may fluctuate from hour to hour. The first walker associated with the storage system may provide a second walker associated with the storage system, a command to restore data associated with the one or more requested files from the hot storage tier to the primary system. In response to the command, the second walker begins restoring the data associated with the one or more requested files from the hot storage tier to the primary system.

From t=5 hr to t=6 hr, the second walker restores 1 GB of data from the hot storage tier to the primary system. From t=6 hr to t=7 hr, the second walker restores 1 GB of data from the hot storage tier to the primary system. From t=7 hr to t=8 hr, the second walker restores 1 GB of data from the hot storage tier to the primary system. From t=8 hr to t=9 hr, the second walker restores 1 GB of data from the hot storage tier to the primary system. From t=9 hr to t=10 hr, the second walker restores 1 GB of data from the hot storage tier to the primary system.

While the second walker is restoring the one or more requested files from the hot storage tier of the cloud storage to the primary system, the first walker may monitor a rate at which the second walker is performing the restoration. In this example, the second walker is restoring data from the hot storage tier of the cloud storage to the primary system at a rate of 1 GB/hr. Although the example depicts the second walker being able to restore data at a constant rate of 1 GB/hr, the rate at which the second walker is able to restore data may fluctuate from hour to hour. The first walker may determine a metric associated with a utilization of the first portion. The determined metric associated with the utilization of the first portion may be based on the rate at which the cloud storage provider is able to change a storage class for data associated with a requested file from the archival storage tier of the cloud storage to the hot storage tier of the cloud storage (e.g., 2 GB/hr) and/or the rate at which the second walker is able to restore data from the hot storage tier of the cloud storage to the primary system (e.g., 1 GB/hr).

At t=10 hr, the first walker may use the determined metric and provide to the cloud storage provider an instruction to change a storage class for the second portion of the one or more requested files from the archival storage tier of the cloud storage to the hot storage tier of the cloud storage. The timing of when to provide the instruction is important to ensure that the storage threshold associated with the hot storage tier is not exceeded.

The second walker may continue to restore any data that is stored in the hot storage tier of the cloud storage to the primary system while the cloud storage provider changes a storage class for data associated with the second portion of the one or more requested files from the archival storage tier to the hot storage tier. From t=10 hr to t=11 hr, the cloud storage provider change a storage class for 2 GB of data from the archival storage tier to the hot storage tier and the second walker restores 1 GB of data from the hot storage tier to the primary system. From t=11 hr to t=12 hr, the cloud storage provider changes a storage class for 2 GB of data from the archival storage tier to the hot storage tier and the second walker restores 1 GB of data from the hot storage tier to the primary system. From t=12 hr to t=13 hr, the cloud storage provider changes a storage class for 2 GB of data from the archival storage tier to the hot storage tier and the second walker restores 1 GB of data from the hot storage tier to the primary system. From t=13 hr to t=14 hr, the cloud storage provider changes a storage class for 2 GB of data from the archival storage tier to the hot storage tier and the second walker restores 1 GB of data from the hot storage tier to the primary system. From t=14 hr to t=15 hr, the cloud storage provider changes a storage class for 2 GB of data from the archival storage tier to the hot storage tier and the second walker restores 1 GB of data from the hot storage tier to the primary system.

At t=15, 10 GB of data associated with the one or more requested files is stored at the hot storage tier of the storage system, which in this example, is the storage threshold associated with the hot storage tier. The second walker may continue to restore the second portion of the one or more requested files in a similar manner as described above with respect to the first portion of the one or more requested files.

Figure 4:
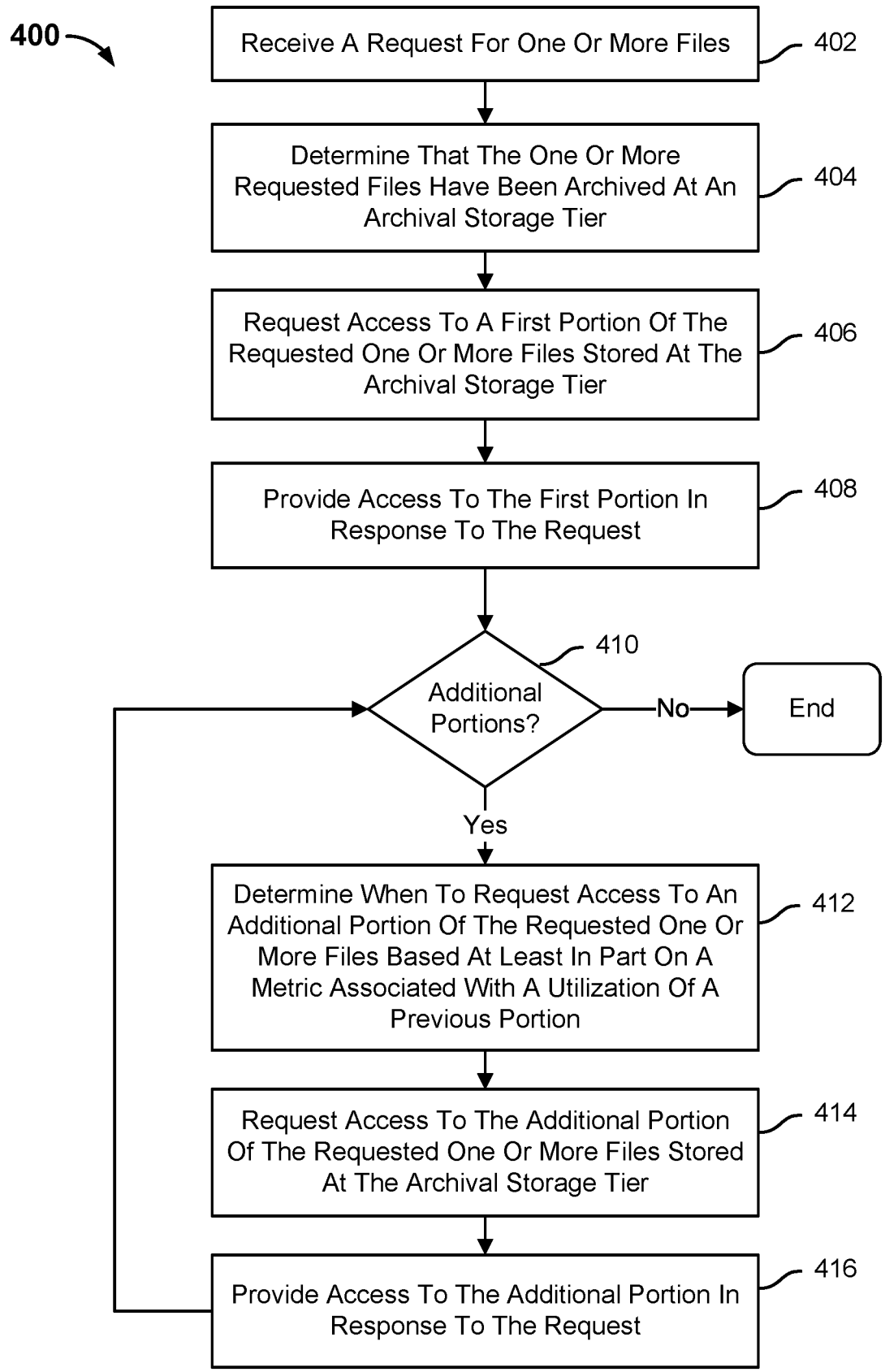
FIG. 4 is a flow diagram illustrating a process for restoring one or more files in accordance with some embodiments.

FIG. 4 is a flow diagram illustrating a process for restoring one or more files in accordance with some embodiments. In the example shown, process 400 may be implemented by a storage system, such as storage system 112.

At 402, a request for one or more files is received. A user associated with a primary system may send to a storage system a request to restore one or more files to the primary system.

At 404, it is determined that the one or more requested files have been archived at an archival storage tier. The storage system may determine a storage location for the one or more requested files by inspecting an index that associates files with their current storage location. The index may indicate a storage location for the data chunks associated with a file. The storage location may be the archival storage tier. Portions of a file may be stored across a plurality of serialized data files. The index may indicate the corresponding storage locations for each of the plurality of serialized data files associated with a file. Each of the one or more requested files is associated with a corresponding file identifier. The storage system may traverse the index based on a file identifier associated with a requested file to identify the one or more serialized data files that correspond to the requested file. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file.

At 406, access to a first portion of the requested one or more files is requested. The storage system may request from a cloud storage provider access to a first portion of the one or more requested files stored at the archival storage tier of the cloud storage. In response to the request, the cloud storage provider may change a storage class for data associated with the first portion of the one or more requested files stored at the archival storage tier of the cloud storage to a hot storage tier of the cloud storage. A storage location at the cloud storage for a first file may be "bucket1/file1." The storage class for the storage location "bucket1/file1" may be changed from an archival storage tier of the cloud storage to the hot storage tier of the cloud storage. The hot storage tier may be used for frequently accessed data.

A size of data corresponding to the first portion of the one or more requested files may correspond to the storage threshold associated with the hot storage tier of the cloud storage (e.g., 10 GB). In some embodiments, the first portion of the one or more requested files includes all of the data associated with the one or more requested files. In some embodiments, the first portion of the one or more requested files includes some of the data associated with one of the one or more requested files. In some embodiments, the first portion of the one or more requested files includes all of the data with at least one of the one or more requested files and some of the data associated with other files included in the request.

The storage system may include a first walker that is configured to monitor the hot storage tier of the cloud storage. The first walker may monitor the rate at which a storage class for data associated with a requested file is being changed from the archival storage tier of the cloud storage to the hot storage tier of the cloud storage.

At 408, access is provided to the first portion of the requested one or more files. After a storage class for the first portion of the one or more requested files has been changed from the archival storage tier of the cloud storage to the hot storage tier of the cloud storage, the first walker may provide to a second walker of the storage system an indication to restore the data associated with the first portion of the one or more requested files from the hot storage tier to the primary system.

In response to receiving the indication from the first walker, the second walker is configured to start a process of restoring the one or more requested files stored at the hot storage tier of the cloud storage. Restoring the first portion of the one or more requested files stored at the hot storage tier of the cloud storage includes reconstructing a portion of a tree data structure corresponding to the one or more requested files based on one or more serialized data files.

The tree data structure reconstructed by the second walker initially includes a root node and references to one or more stub nodes. A stub node is a placeholder for an actual node of a tree data structure. The stub node includes a reference to a data block of a serialized flat set of data. The second walker may reconstruct the portion of a tree data structure corresponding to the one or more requested files by reading one or more serialized data files and updating the tree data structure by replacing a stub node with an actual node of the tree data structure that is associated with one of the one or more requested files.

The second walker may traverse the partially restored tree data structure from a root node of the partially restored tree data structure to a leaf node of the partially restored tree data structure and update the partially restored tree data structure to include metadata for the one or more requested files. A leaf node of the partially restored tree data structure indicates a storage location for one or more data chunks associated with a requested file. For example, the storage location may be a storage location at the hot storage tier of the cloud storage. After the second walker has updated the partially restored tree data structure, the second walker may restore the data associated with the one or more requested files from the hot storage tier of the cloud storage to the primary system.

The first walker may request a cloud storage provider to change a storage class for data associated with a file included in the first portion of the one or more requested files after the data associated with the file included in the first portion of the one or more requested files is restored from the hot storage tier of the cloud storage to a primary system. This frees up storage space of the hot storage tier that is allocated to an entity associated with the primary system.

At 410, it is determined whether there are more portions of the one or more requested files. In the event there are more portions for the one or more requested files, process 400 proceeds to 412. In the event there are no more portions for the one or more requested files, process 400 ends.

At 412, it is determined when to request access to an additional portion of the requested one or more files based at least in part on a metric associated with a utilization of a previous portion. While the second walker is restoring the one or more requested files from the hot storage tier of the cloud storage to the primary system, the first walker may monitor a rate at which the second walker is performing the restoration.

The first walker may determine a metric associated with a utilization of the first portion. The determined metric associated with the utilization of the first portion may be based on the rate at which the cloud storage provider is able to change a storage class for data associated with a requested file from the archival storage tier of the cloud storage to the hot storage tier of the cloud storage and/or the rate at which the second walker is able to restore data from the hot storage tier of the cloud storage to the primary system. The first walker may use the determined metric to configure a request for an additional portion of the one or more requested files (e.g., $2^{nd}$ portion, $3^{rd}$ portion, . . . , nth portion) from the archival storage tier of the cloud storage to the hot storage tier of the cloud storage. A size of data, a quality of service, a priority of a request, and a timing of a request associated with the additional portion of the one or more requested files may be based on the determined metric such that the storage threshold associated with the hot storage tier is not exceeded.

At 414, access to the additional portion of the requested one or more files is requested. The storage system may request from a cloud storage provider access to the additional portion of the one or more requested files stored at the archival storage tier of the cloud storage. In response to the request, the cloud storage provider may change a storage class for the additional portion of the one or more requested files stored at the archival storage tier of the cloud storage to the hot storage tier of the cloud storage.

The storage system may include a first walker that is configured to monitor the hot storage tier of the cloud storage. The first walker may monitor the rate at which a storage class for data associated with a requested file is being changed from the archival storage tier of the cloud storage to the hot storage tier of the cloud storage.

A size of data, a quality of service, a priority of a request, and a timing of a request associated with the additional portion of the one or more requested files may be based on the determined metric such that the storage threshold associated with the hot storage tier is not exceeded, the rate at which the cloud storage provider is able to change a storage class for data from the archival storage tier to the hot storage tier of the cloud storage, and/or the rate at which the second walker is able to restore data from the hot storage tier of the cloud storage to the primary system. The first walker may request an amount of data for the additional portion of the one or more requested files such that storing the additional portion in the hot storage tier of the cloud storage will not exceed the storage threshold associated with the hot storage tier of the cloud storage.

For example, a storage threshold associated with the hot storage tier of the cloud storage may be 10 GB. The second walker may be restoring 10 GB of data from the hot tier storage of the cloud storage provider to the primary system. After four hours, the second walker may have restored 4 GB of the 10 GB of data, i.e., a restore rate of 1 GB/hour. The cloud storage may have restored the 10 GB of data from the archival storage tier to the hot tier storage of the cloud storage provider in 5 hours, i.e., a storage class change rate of 2 GB/hour. After 5 hours of restoring data from the hot storage tier to the primary system, the first walker may use the restore rate and the storage class change rate to request from the cloud storage provider to change a storage class for an additional 10 GB of the one or more requested files even though the second walker has not finished restoring all of the data included in the first portion of the one or more requested files.

In some embodiments, the first walker monitors a rate at which data associated with the first portion of the one or more requested files is being restored from a hot storage tier of a cloud storage to a primary system. The first walker may dynamically adjust when to request access to an additional portion of the one or more requested files stored at the archival storage tier based on the monitored rate. For example, the first walker may determine that a rate at which the second walker is restoring data associated with a previous portion has slowed down after the first walker has requested access to the additional portion of the one or more requested files.

At 416, access is provided to the additional portion of one or more requested files. A second walker may access the additional portion of the one or more requested files and restore the one or more requested files in a manner as described with respect to 408.

In some embodiments, the first walker requests the cloud storage provider to store the additional portion of the one or more requested files in the hot storage tier of the cloud storage beyond a threshold period in the event a previous portion of the one or more requested files is unable to be restored to the primary system within a threshold amount of time. For example, a cloud storage provider may delete data from the hot storage tier after the threshold amount of time to free up resources of the hot storage tier. Requesting the cloud storage provider to extend the amount of time that the additional portion of the one or more requested files is stored in the hot storage tier of the cloud storage may reduce the overall amount of time to restore the one or more requested files and resources used because the cloud storage provider does not need to change, a second time, a storage class for the additional portion of the one or more requested files from the archival storage tier to the hot storage tier of the cloud storage.

Figure 5:
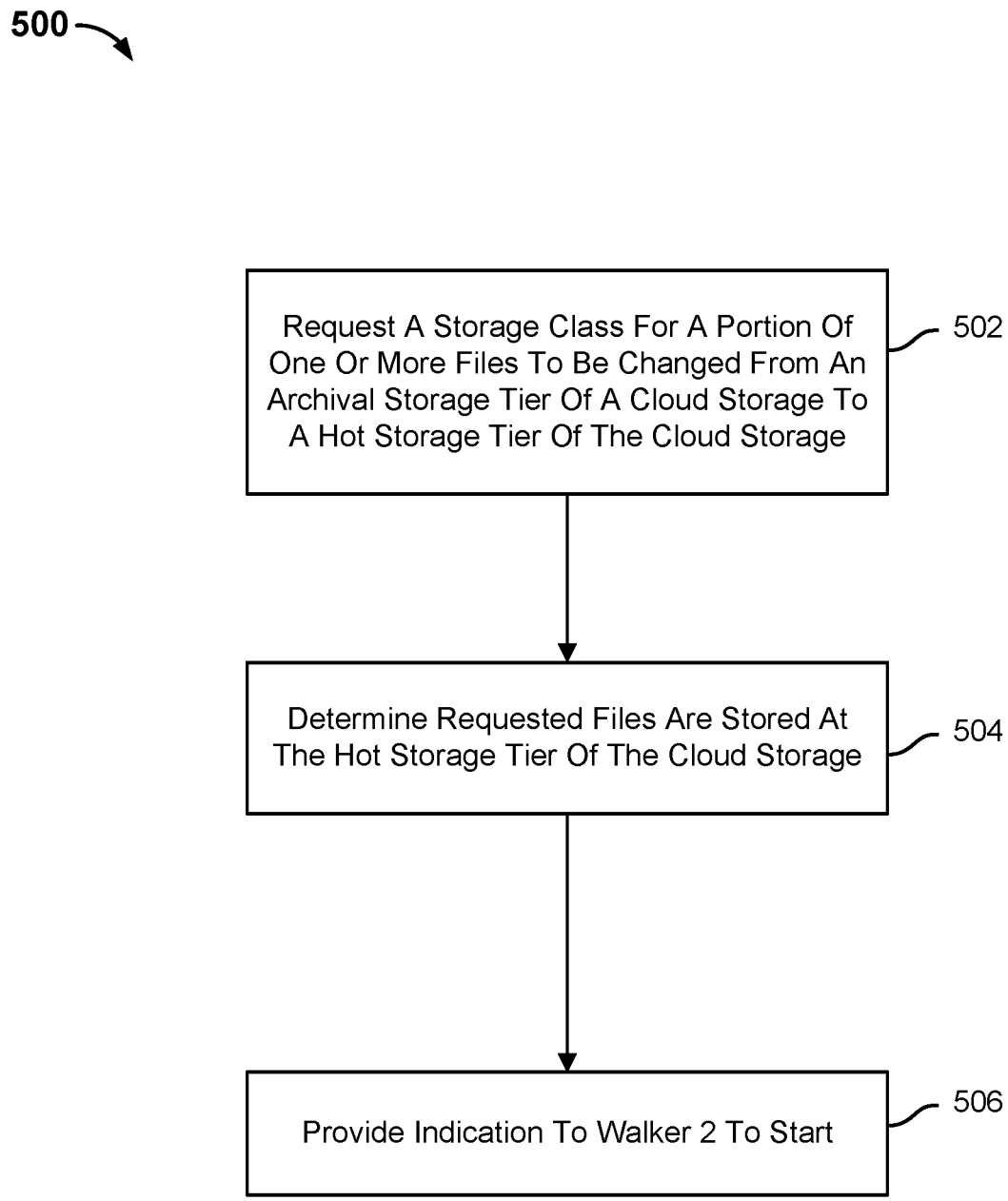
FIG. 5 is a flow diagram illustrating a process for accessing a portion of one or more requested files in accordance with some embodiments.

FIG. 5 is a flow diagram illustrating a process for accessing a portion of one or more requested files in accordance with some embodiments. In the example shown, process 500 may be implemented by a storage system, such as storage system 112. In some embodiments, process 500 is implemented to perform some or all of step 406 or step 414 of process 400.

At 502, a storage class for a portion of the one or more file to be changed from an archival storage tier of a cloud storage to a hot storage tier of the cloud storage is requested. A storage location at the cloud storage for a first file may be "bucket1/file1." The request may be to change a storage class for the storage location "bucket1/file1" from the archival storage tier of the cloud storage to the hot storage tier of the cloud storage.

A size of data corresponding to the portion of the one or more requested files may correspond to a storage threshold associated with the hot storage tier of the cloud storage (e.g., 10 GB). In some embodiments, the size of data corresponding to an additional portion of the one or more requested files, a quality of service, a priority of a request, and a timing of a request associated with the additional portion is based on a metric associated with utilization of a previous portion. The determined metric associated with the utilization of the previous portion may be based on the rate at which the cloud storage provider associated with a cloud storage is able to change a storage class for data associated with the previous portion from an archival storage tier to a hot storage tier and/or the rate at which a second walker is able to restore data associated with a previous portion from the hot storage tier to the primary system.

At 504, it is determined that the one or more requested files are stored at the hot storage tier of the cloud storage. The first walker may monitor the data that is stored at the hot storage tier of the cloud storage.

At 506, an indication is provided to a second walker. In response to receiving the indication from a first walker, a second walker is configured to start a process of restoring the one or more requested files stored at the hot storage tier.

Figure 6:
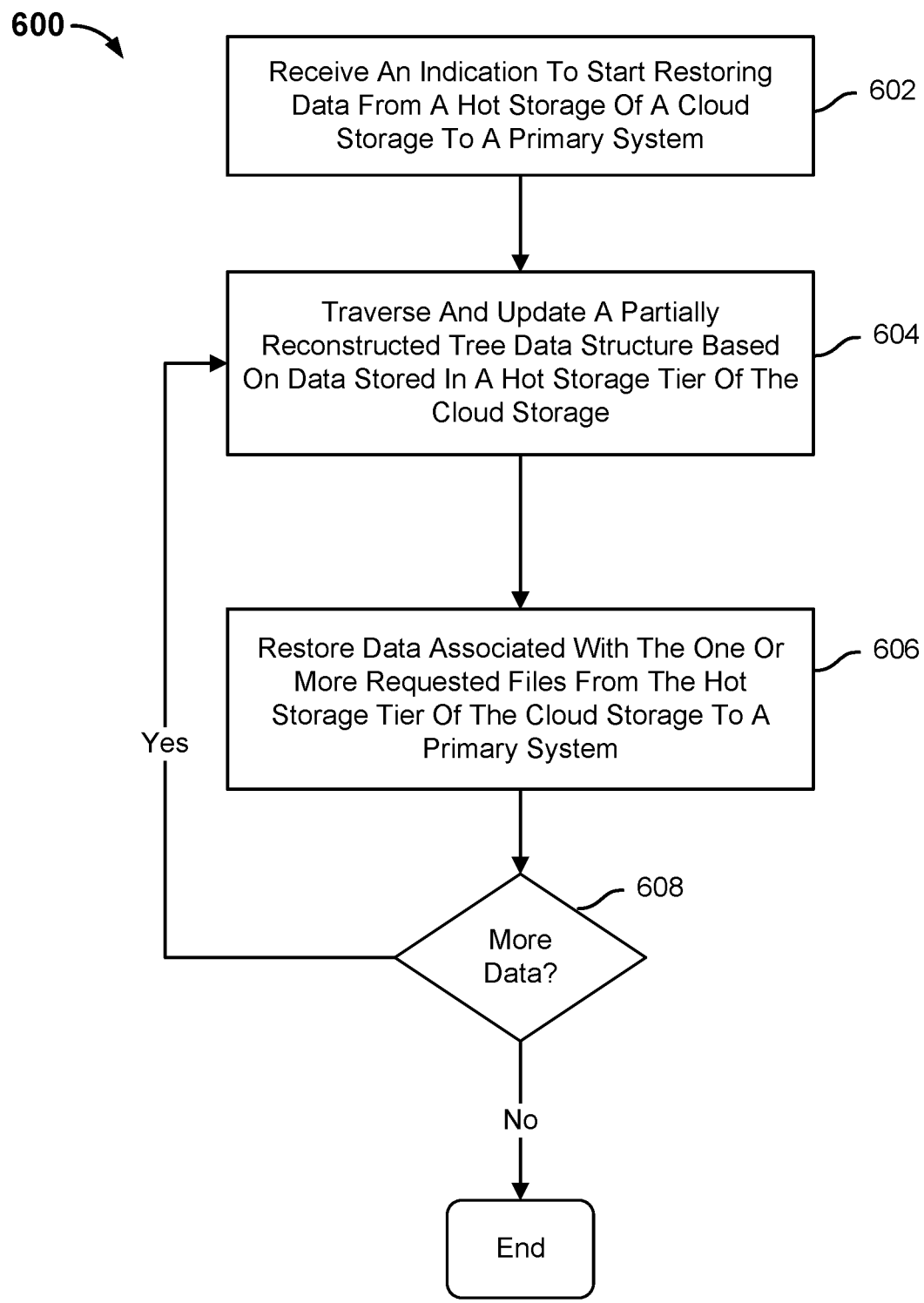
FIG. 6 is a flow diagram illustrating a process for providing access to one or more requested files in accordance with some embodiments.

FIG. 6 is a flow diagram illustrating a process for providing access to one or more requested files in accordance with some embodiments. In the example shown, process 600 may be implemented by a storage system, such as storage system 112. In some embodiments, process 600 is implemented to perform some or all of step 408 or step 416 of process 400.

At 602, an indication to start restoring one or more files from a hot storage of a cloud storage to a primary system is received.

At 604, a partially restored tree data structure is traversed and updated based on data stored in a hot storage of the cloud storage. The tree data structure partially restored by the second walker initially includes a root node and references to one or more stub nodes. A stub node is a placeholder for an actual node of a tree data structure. The stub node includes a reference to a data block of a serialized flat set of data.

The second walker may traverse the partially restored tree data structure from a root node of the partially restored tree data structure to a leaf node of the partially restored tree data structure and update the partially restored tree data structure to include metadata for the one or more requested files. A leaf node of the partially restored tree data structure indicates a storage location for one or more data chunks associated with a requested file. For example, the storage location may be a storage location at the hot storage tier of the cloud storage.

At 606, data associated with the one or more requested files is restored from the hot storage of the cloud storage to a primary system.

At 608, it is determined whether there is more data stored of the requested files in the hot storage of the cloud storage. The second walker may continue to restore any data that is stored in the hot storage tier of the cloud storage to the primary system. In the event there is more data stored in the hot storage of the cloud storage, process 600 returns to 604. In the event there is not more data stored in the hot storage of the cloud storage, process 600 ends.

Figure 7A:
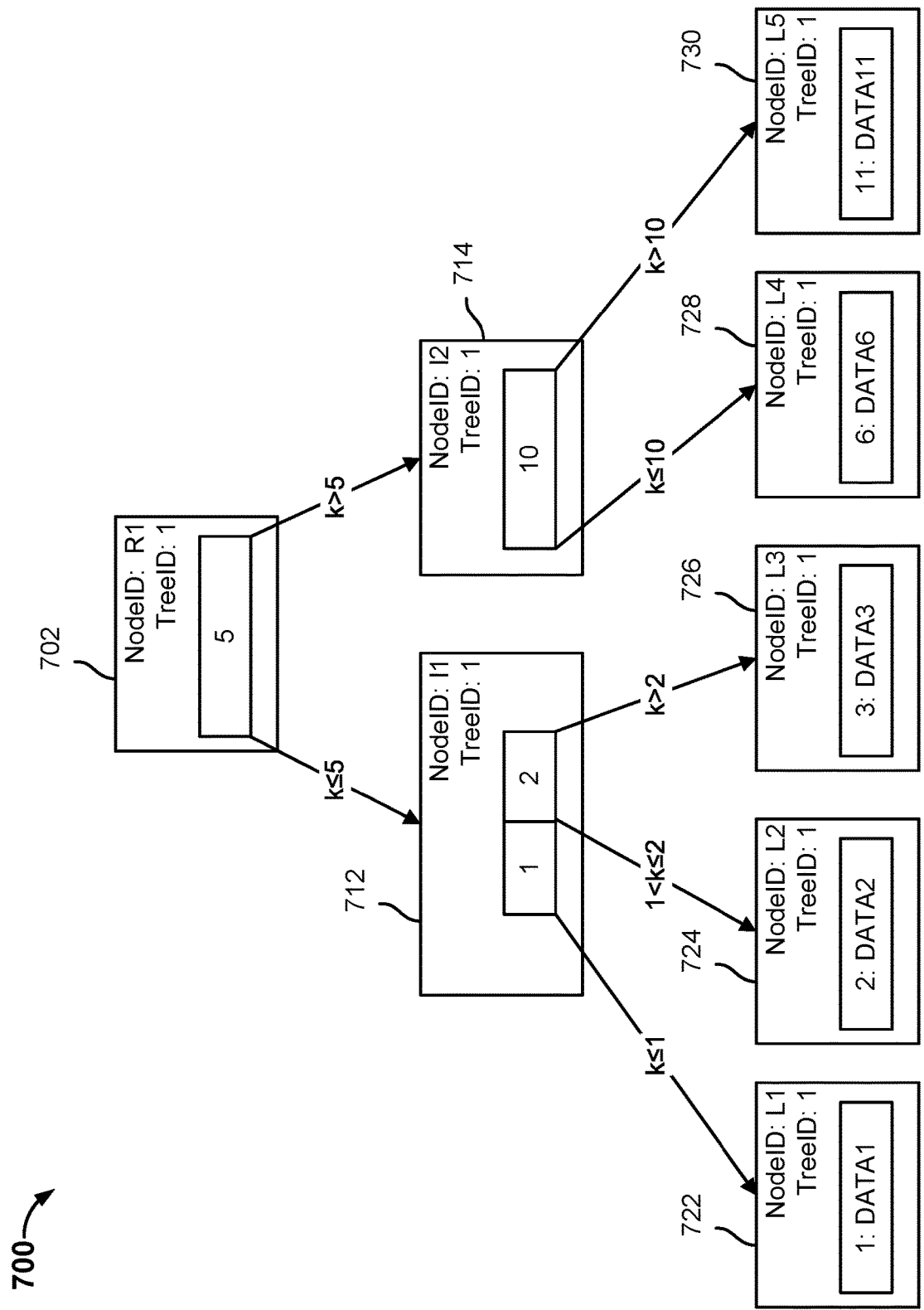
FIG. 7A is a block diagram illustrating an embodiment of a tree data structure.

FIG. 7A is a block diagram illustrating an embodiment of a tree data structure. A tree data structure may be used to organize the file system data included in a backup snapshot that is stored on a storage system, such as storage system 112. The file system data may include metadata for a distributed file system and may include information, such as chunk identifier, chunk offset, file size, directory structure, file permissions, physical storage locations of the content files, etc. A file system manager, such as file system manager 117, may generate tree data structure 700. Tree data structure 700 may correspond to a full backup snapshot.

Tree data structure 700 is a snapshot tree that includes root node 702, intermediate nodes 712, 714, and leaf nodes 722, 724, 726, 728, and 730. Although tree data structure 700 includes one intermediate level between root node 702 and leaf nodes 722, 724, 726, 728, 730, any number of intermediate levels may be implemented. Tree data structure 700 may correspond to a backup snapshot of a primary system at a particular point in time, for example, at time t=1. The snapshot tree in conjunction with a plurality of file metadata structures may provide a complete view of the primary system at the particular point in time. Each node of the tree structure is associated with a view identifier that indicates the view with which the node is associated (e.g., TreeID) and a corresponding node identifier (e.g., NodeID).

A root node or an intermediate node may be associated with one or more node keys. The node key may be an integer value or a non-integer value. Each node key indicates a division between the branches of the node and indicates how to traverse the tree structure to find a leaf node, i.e., which pointer to follow. In the example shown, to find a leaf node storing a value associated with a data key of "1," "2," or "3," a first branch of root node 702 would be traversed to intermediate node 712 because the data keys of "1," "2," and "3" are less than or equal to the node key "5." To find a leaf node storing a value associated with a data key of "6" or "11," a second branch of root node 702 would be traversed to intermediate node 714 because data keys "6" and "11" are greater than the node key of "5." A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "5."

A leaf node may be configured to store a key-value pair. A data key k is a lookup value by which a particular leaf node may be accessed. A leaf node may store an identifier of a data brick that is associated with one or more data blocks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with a content file when the size of the content file is less than or equal to a limit size (e.g., 256 kB). In some embodiments, a leaf node includes a pointer to a file metadata structure (e.g., blob structure) when the size of file metadata associated with a content file is larger than the limit size.

In the example shown, root node 702 includes pointers to intermediate nodes 712, 714. Root node 702 includes a NodeID of "R1" and a TreeID of "1." Root node 702 includes a node key that divides a set of pointers into two different subsets. Leaf nodes with a data key k (e.g., "1-3") that is less than or equal to the node key are associated with a first branch and leaf nodes with a data key k (e.g., "6, 11") that is greater than the node key are associated with a second branch.

Intermediate node 712 includes a pointer to leaf node 722, a pointer to leaf node 724, and a pointer to leaf node 726. Intermediate node 712 includes a NodeID of "I1" and a TreeID of "1." Intermediate node 712 includes a first node key of "1" and a second node key of "2." The data key k for leaf node 722 (e.g., "1") is a value that is less than or equal to the first node key. The data key k for leaf node 724 (e.g., "2") is a value that is greater than the first node key and less than or equal to the second node key. The data key k for leaf node 726 (e.g., "3") is a value that is greater than the second node key.

Intermediate node 714 includes a pointer to leaf node 728 and a pointer to leaf node 730. Intermediate node 714 includes a NodeID of "I2" and a TreeID of "1." Intermediate node 714 includes a node key of "10." The data key k for leaf node 728 (e.g., 6) is a value that is less than or equal to the node key. The data key k for leaf node 730 (e.g., 11) is a value that is greater than the node key.

Leaf nodes 722, 724, 726, 728, 730 include respective data key-value pairs of "1: DATA1," "2: DATA2," "3: DATA3," "6: DATA6," "11: DATA11." Leaf nodes 722, 724, 726, 728, 730 include respective Node IDs of "L1," "L2," "L3," "L4," "L5." Leaf nodes 722, 724, 726, 728, 730 all include a TreeID of "1." In some embodiments, leaf nodes 722, 724, 726, 728, or 730 are configured to store metadata. In other embodiments, leaf nodes 722, 724, 726, 728, or 730 are configured to store content file data when the size of the content file is less than or equal to a limit size. In other embodiments, leaf nodes 722, 724, 726, 728, or 730 are file inodes and are configured to store a pointer to or an identifier of a respective file metadata structure (e.g., file metadata tree). In some embodiments, leaf node 722, 724, 726, 728, or 730 store a corresponding reference to a storage location of a corresponding file (e.g., archival storage location). In some embodiments, leaf node 722, 724, 726, 728, or 730 store corresponding file identifiers that are associated with corresponding files. In some embodiments, the file identifier for a file corresponds to a particular inode id of the storage system. In some embodiments, a node of the tree data structure stores an inode id of the storage system that corresponds to the file. In some embodiments, the file identifier for the file is a file path. In some embodiments, a node of the tree data structure stores a file path that corresponds to the file.

Figure 7B:
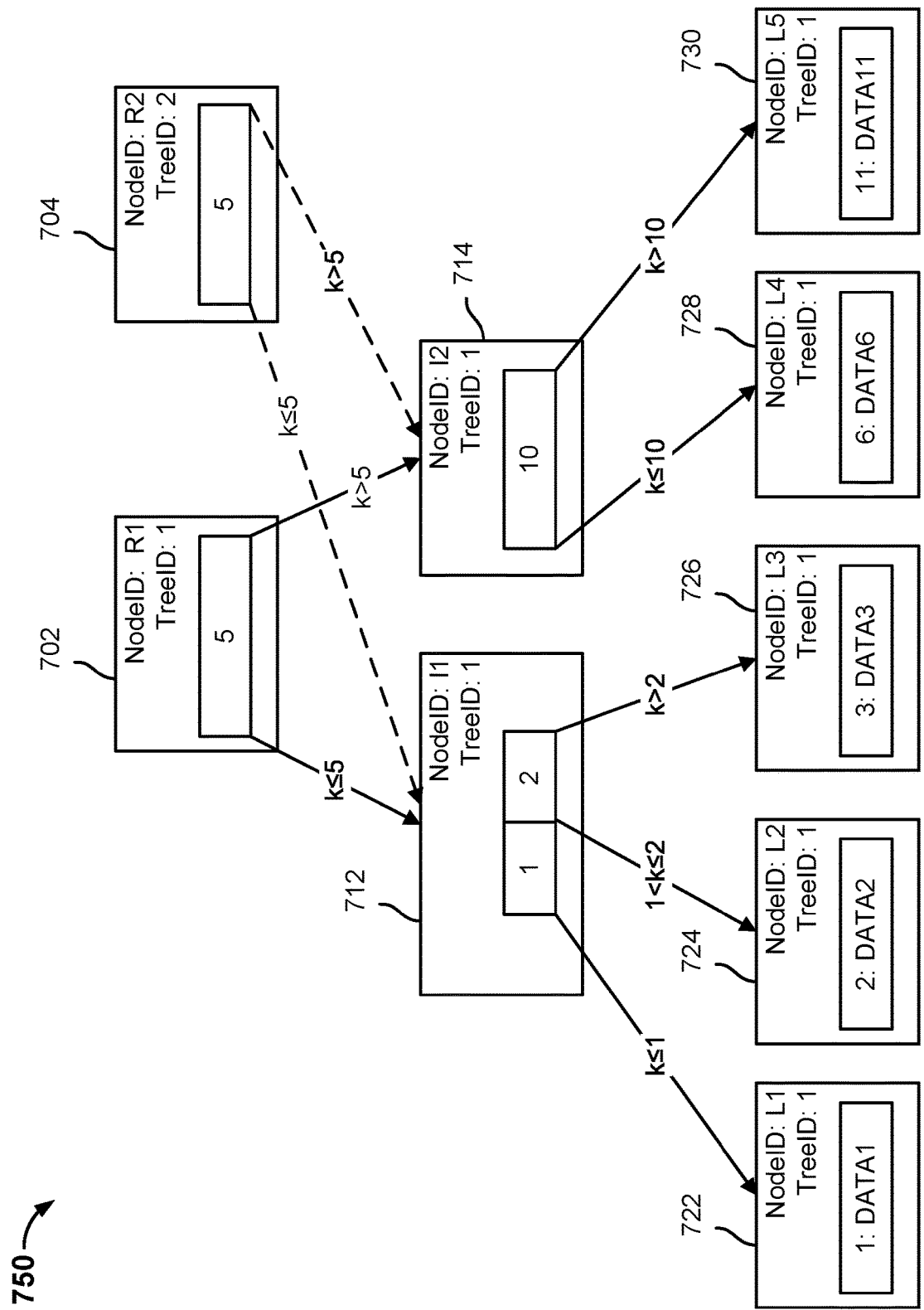
FIG. 7B is a block diagram illustrating an embodiment of a cloned tree data structure.

FIG. 7B is a block diagram illustrating an embodiment of a cloned tree data structure. In some embodiments, tree data structure 750 may be created by a storage system, such as storage system 112.

The tree data structure depicted in FIG. 7A may correspond to an initial backup snapshot. The file system data of a primary system may be backed up again in a subsequent backup snapshot, which may be an incremental backup snapshot. The manner in which the file system data corresponding to the subsequent backup snapshot is stored in a storage system may be represented by a tree data structure. The tree data structure corresponding to the subsequent backup snapshot is generated in part by cloning a snapshot tree associated with a previous backup snapshot.

In the example shown, tree data structure 750 includes root nodes 702, 704, intermediate nodes 712, 714, and leaf nodes 722, 724, 726, 728, and 730. Tree data structure 750 can be used to capture different versions of file system data at different moments in time (e.g., different versions of a file, different versions of a primary system, etc.). The tree data structure allows a chain of backup snapshot versions to be linked together by allowing a node of a later version of a snapshot tree to reference a node of a previous version of a snapshot tree. For example, a snapshot tree with root node 704 is linked to a snapshot tree with root node 702. When a backup snapshot is performed, a new root node may be created by cloning a previous root node. The new root node initially includes the same set of pointers as the previous root node, but includes a different NodeID and a different TreeID.

In some embodiments, a root node is associated with a current view of the file system data. A current view may still accept one or more changes to the data. In the example shown, root node 704 is associated with a current view of the file system data. In other embodiments, a root node is associated with a snapshot view of the file system data. A snapshot view may represent a state of the file system data at a particular moment in time in the past and is not updated. In the example shown, root node 702 is associated with a snapshot view of the file system data.

To generate a snapshot tree corresponding to an incremental backup snapshot at time t=2, root node 702 is cloned, i.e., copied. Root node 704 is a copy of root node 702 and includes the same pointers as root node 702, but includes a different NodeID ("R2") and a different TreeID ("2).

Figure 7C:
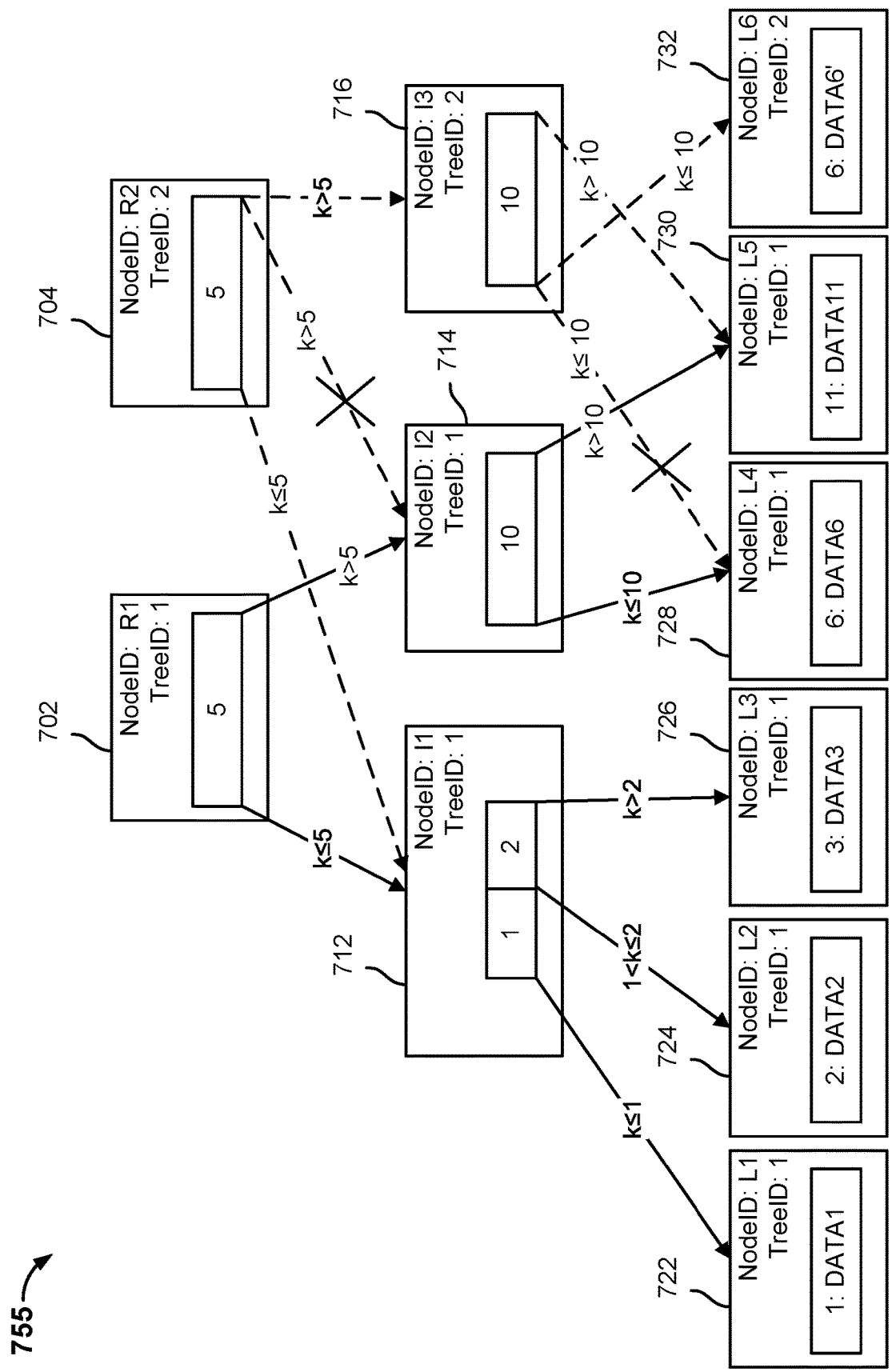
FIG. 7C is a block diagram illustrating an embodiment of modifying a cloned tree data structure.

FIG. 7C is a block diagram illustrating an embodiment of modifying a tree data structure. In the example shown, tree data structure 755 may be modified by a file system manager, such as file system manager 117. A snapshot tree with a root node 704 may be a current view of the file system data, for example, at time t=2.

In the example shown, the value "DATA6" has been modified to be "DATA6'." For example, the value of "DATA6" may point to a file metadata structure corresponding to a content file that is stored on a storage system, such as storage system 112, and the value of "DATA6'" may point to a cloud storage location (e.g., "bucket 1/file1") for the content file. In some embodiments, the value of a key value pair has been modified. In other embodiments, the value of the key value pair is the file data associated with a content file that is smaller than or equal to a limit size. In other embodiments, the value of the key value pair points to a different file metadata structure (e.g., a file metadata structure corresponding to a different version of a file. The different file metadata structure may be a modified version of the file metadata structure that the leaf node previously pointed.

To modify the snapshot tree at time t=2, the file system manager starts at root node 704 because that is the root node associated with the snapshot tree at time t=2. The value "DATA6" is associated with the data key "6." The file system manager traverses snapshot tree 755 from root node 704 until it reaches a target node, in this example, leaf node 728. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 704 and proceeds to intermediate node 714. The file system manager compares the TreeID of intermediate node 714 with the TreeID of root node 704, determines that the TreeID of intermediate node 714 does not match the TreeID of root node 704, and creates a shadow copy of intermediate node 714. The intermediate node copy 716 includes the same set of pointers as intermediate node 714, but includes a TreeID of "2" to match the TreeID of root node 704. The file system manager updates a pointer of root node 704 to point to intermediate node 716 instead of pointing to intermediate node 714. The file system manager traverses tree data structure 755 from intermediate node 716 to leaf node 728, determines that the TreeID of leaf node 728 does not match the TreeID of root node 704, and creates a copy of leaf node 728. Leaf node copy 732 stores the modified value "DATA6'" and includes the same TreeID as root node 704. The file system manager updates a pointer of intermediate node 716 to point to leaf node 732 instead of pointing to leaf node 728.

In some embodiments, leaf node 732 stores the value of a key value pair that has been modified. In other embodiments, leaf node 732 stores the modified data associated with a content file that is smaller than or equal to a limit size. In some embodiments, leaf node 732 stores a reference to a cloud storage location for a content file.

Figure 7D:
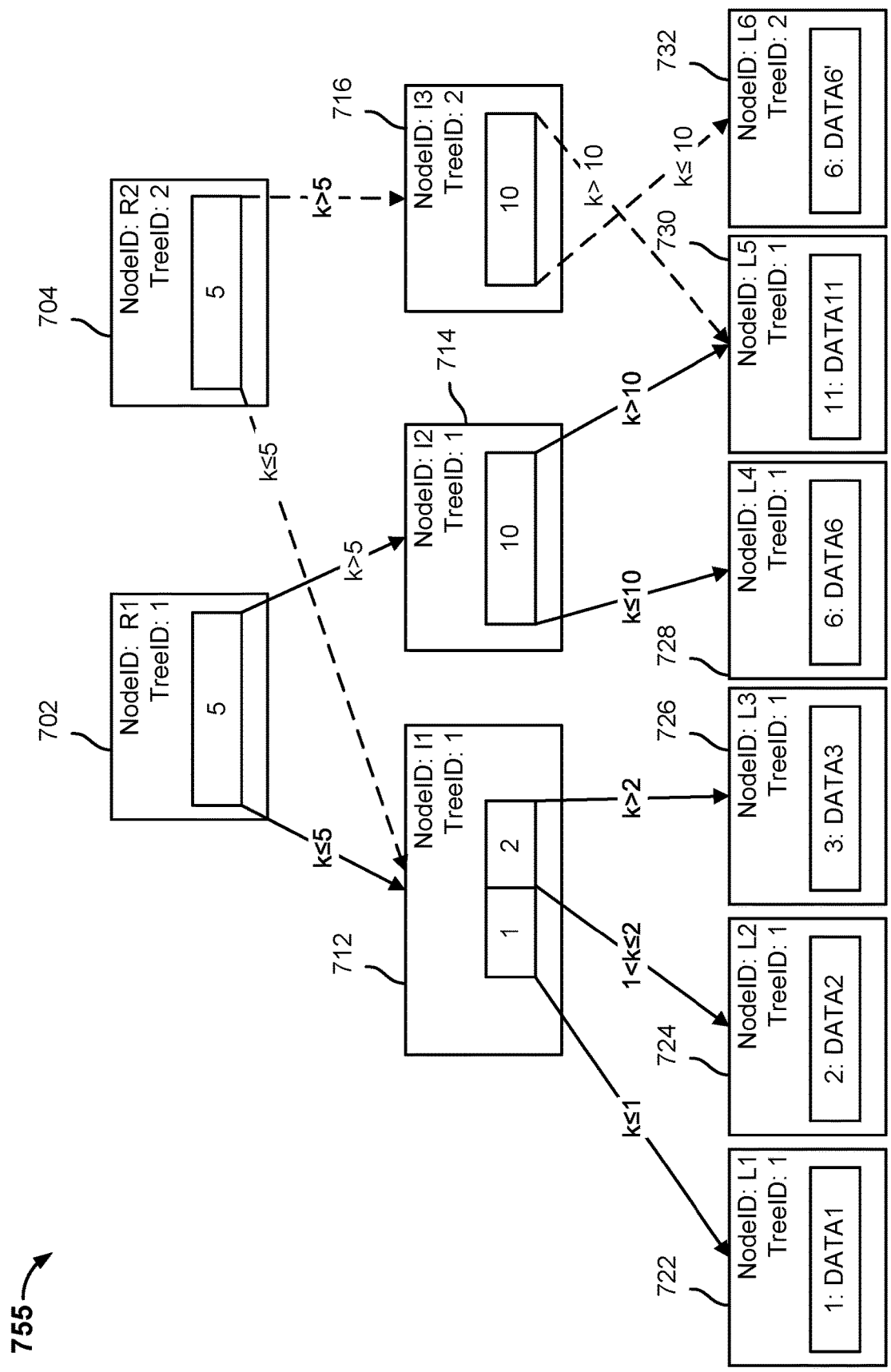
FIG. 7D is a block diagram illustrating an embodiment of a modified tree data structure.

FIG. 7D is a block diagram illustrating an embodiment of a modified tree data structure. Tree data structure 755 shown in FIG. 7D illustrates a result of the modifications made to a snapshot tree as described with respect to FIG. 7C.

Figure 8A:
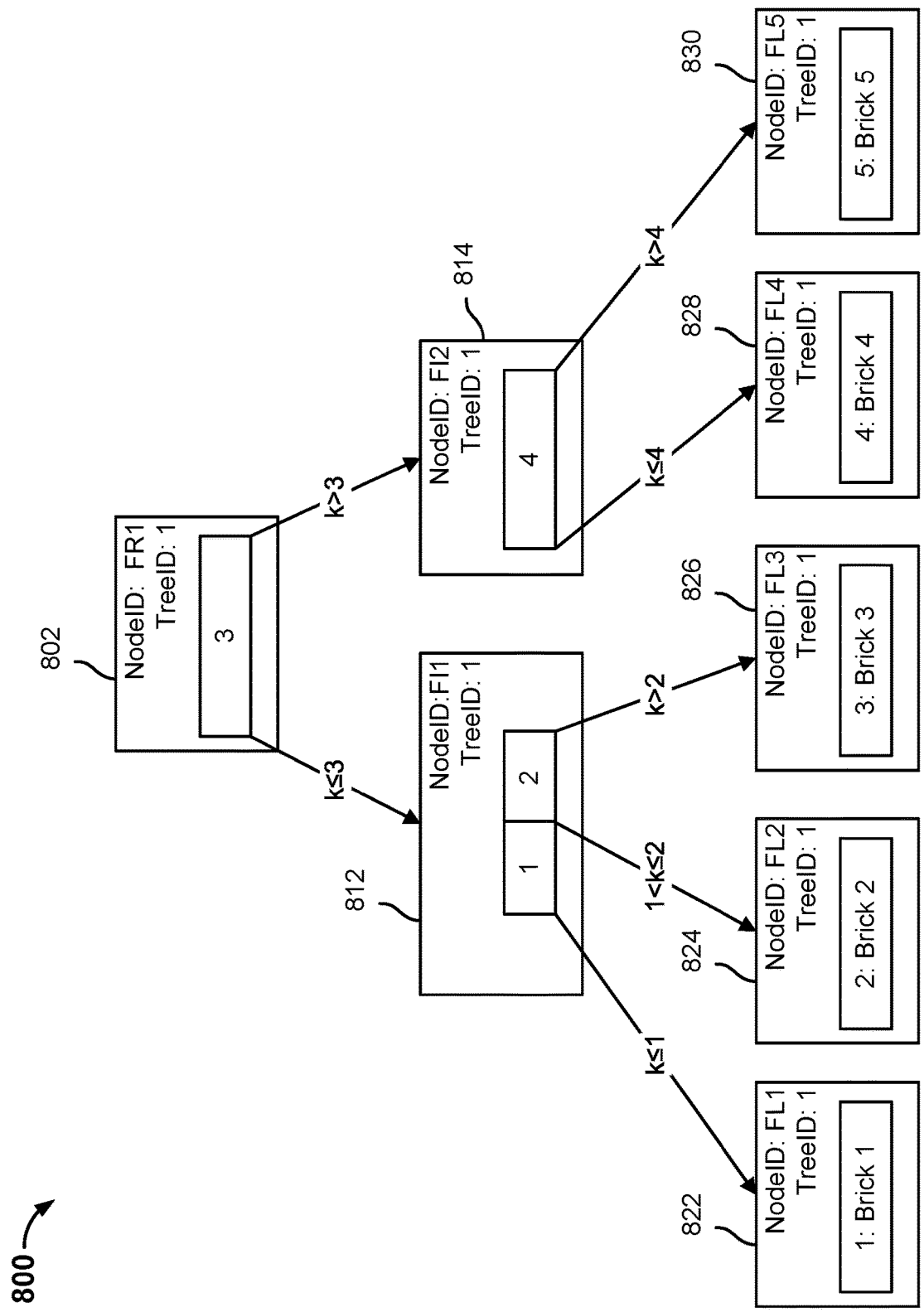
FIG. 8A is a block diagram illustrating an embodiment of a tree data structure.

FIG. 8A is a block diagram illustrating an embodiment of a tree data structure. In some embodiments, tree data structure 800 may be created by a storage system, such as storage system 112. Tree data structure 800 may be used to store the metadata associated with a file or a workload. In the example shown, tree data structure 800 corresponds to a file metadata structure and stores the file metadata associated with the content file. The file metadata associated with a content file may be stored by a storage system separate from the contents of the file, that is, the file metadata structure storing the file metadata associated with a content file is stored separately from the contents of the content file. For example, the contents of the file may be stored on a hard disk drive, while tree data structure 800 that holds the file metadata may be stored in storage with faster access times, such as a solid state drive (SSD) of a storage node.

A leaf node of a snapshot tree associated with file system data, such as a leaf node of tree data structures 700, 750, 755, may include a pointer to a file metadata structure, such as tree data structure 800. A file metadata structure is used to organize the data chunks associated with a content file (e.g., data components) that are stored on the storage system.

A file metadata structure corresponding to a content file at a particular point in time (e.g., a particular version) may be comprised of a root node, one or more levels of one or more intermediate nodes, and one or more leaf nodes. In some embodiments, a file metadata structure corresponding to a content file is comprised of a root node and one or more leaf nodes without any intermediate nodes. Tree data structure 800 may be a snapshot of a content file at a particular point in time t, for example at time t=1. Tree data structure 800 may correspond to a full backup of a content file.

In the example shown, tree data structure 800 includes file root node 802, file intermediate nodes 812, 814, and file leaf nodes 822, 824, 826, 828, 830. Similar to the snapshot trees described above, each node includes a "NodeID" that identifies the node and a "TreeID" that identifies a view with which the node is associated (e.g., a version of the content file). Root node 802 includes pointers to intermediate nodes 812, 814. Root node 802 includes a NodeID of "FR1" and a TreeID of "1."

In the example shown, intermediate node 812 includes respective pointers to leaf nodes 822, 824, 826. Intermediate node 812 includes a NodeID of "FI1" and a TreeID of "1." Intermediate node 812 includes a first node key and a second node key. The data key k for leaf node 822 is a value that is less than or equal to the first node key. The data key for leaf node 824 is a value that is greater than the first node key and less than or equal to the second node key. The data key for leaf node 826 is a value that is greater than the second node key.

In the example shown, intermediate node 814 includes respective pointers to leaf nodes 828, 830. Intermediate node 814 includes a NodeID of "FI2" and a TreeID of "1." Intermediate node 814 includes a node key. The data key k for leaf node 828 is a value that is less than or equal to the node key. The data key for leaf node 830 is a value that is greater than the first node key.

Leaf nodes 822, 824, 826, 828, 830 include respective data key-value pairs of "1: Brick 1," "2: Brick 2," "3: Brick 3," "4: Brick 4," and "5: Brick 5." "Brick 1," "Brick 2," "Brick 3," "Brick 4," and "Brick 5" are brick identifiers that identify a data brick that is associated with one or more data chunks of a content file corresponding to tree data structure 800. Leaf nodes 822, 824, 826, 828, 830 each include a TreeID of "1." Leaf node 822 includes a NodeID of "FL1," leaf node 824 includes a NodeID of "FL2," leaf node 826 includes a NodeID of "FL3," leaf node 828 includes a NodeID of "FL4," and leaf node 830 includes a NodeID or "FL5."

A content file may be comprised of a plurality of data chunks. A brick may be associated with one or more data chunks. In the example shown, leaf nodes 822, 824, 826, 828, 830 each store a corresponding brick identifier. A metadata store, such as metadata store 114, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 8B:
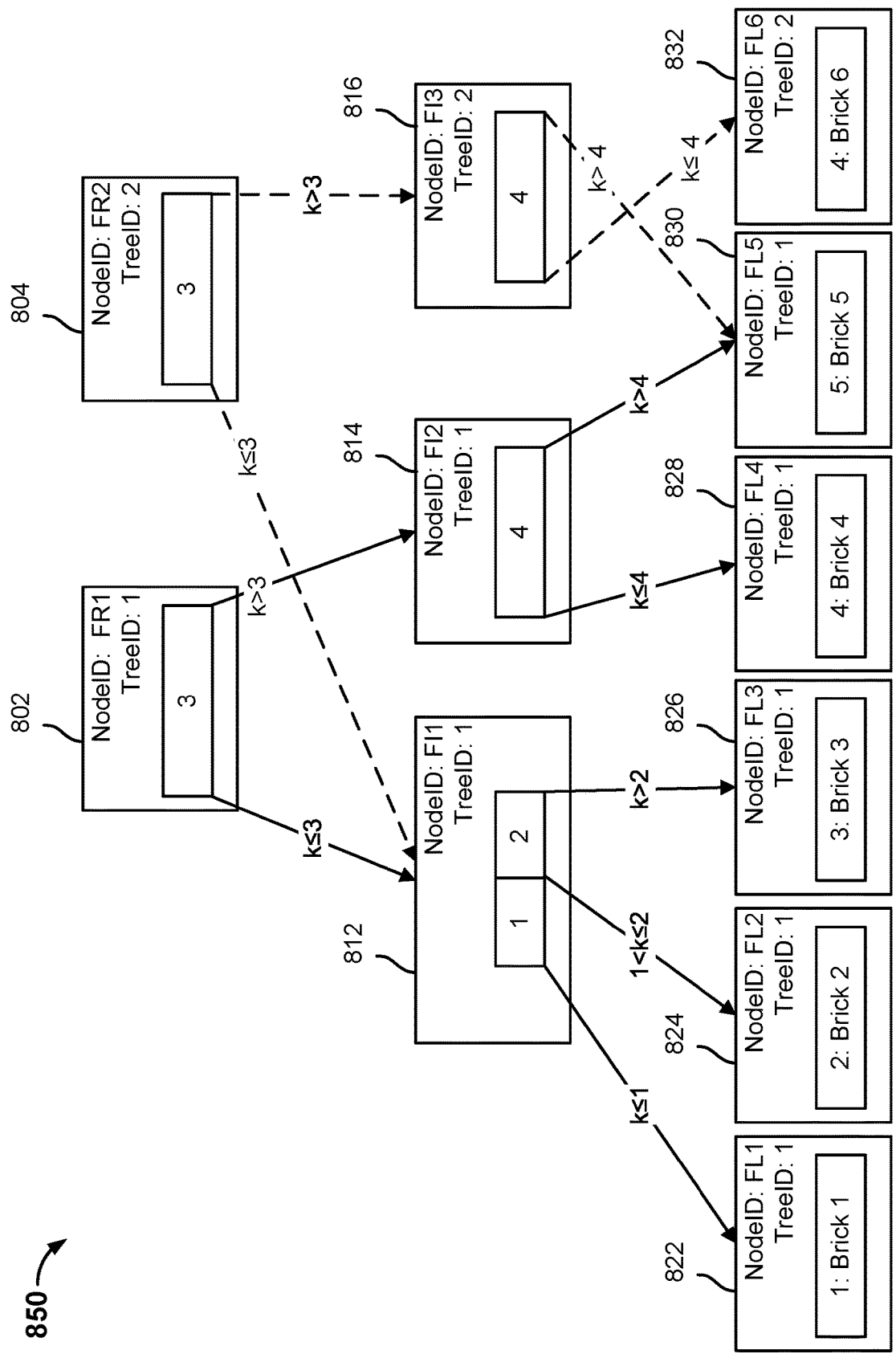
FIG. 8B is a block diagram illustrating an embodiment of a modified tree data structure.

FIG. 8B is a block diagram illustrating an embodiment of a modified tree data structure. The tree data structure allows a chain of file metadata structures to be linked together. When a backup snapshot is performed, a root node of the file metadata structure associated with a previous file metadata structure may be cloned and the new root node be linked to one or more intermediate nodes associated with a previous file metadata structure.

In the example shown, the file metadata structure at time t=2 is linked to the file metadata structure at time t=1. At t=2, the file metadata structure includes root node 804, intermediate nodes 812, 816, and leaf nodes 822, 824, 826, 830, 832. Root node 802 is associated with a backup snapshot at time t=1 and root node 804 is associated with a backup snapshot at time t=2.

Root node 804 is a clone of root node 802, but has a different NodeID and a different TreeID. A version of the file at t=1 has been modified such that it includes one or more data chunks associated with "Brick 6" instead of the one or more data chunks associated with "Brick 4." The file metadata structure with root node 804 is modified in a similar manner as the snapshot tree described with respect to FIG. 7C so that the file metadata structure with root node 804 includes a reference to leaf node 832 instead of leaf node 828.

Figure 9A:
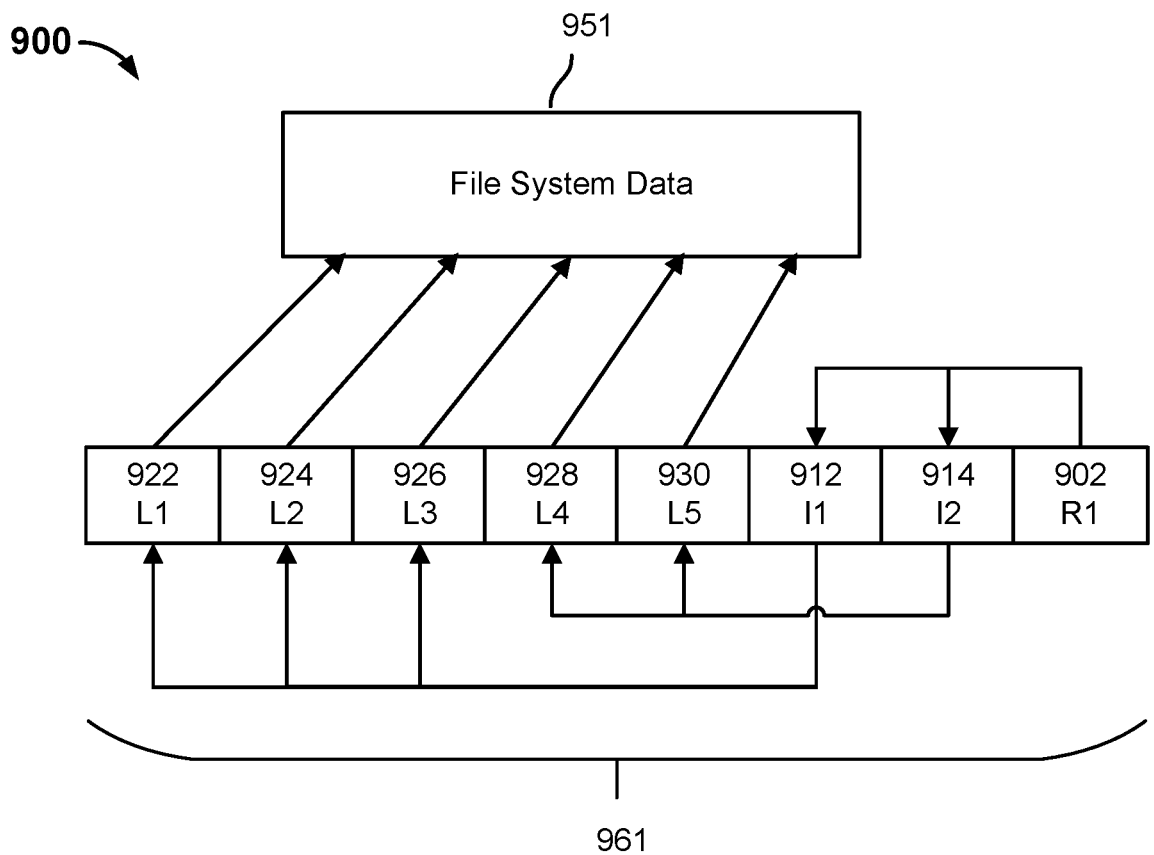
FIG. 9A is a block diagram illustrating an embodiment of archive data.

FIG. 9A is a block diagram illustrating an embodiment of archive data. A snapshot is the state of a system at a particular moment in time. A backup snapshot may be stored at a storage system, such as storage system 112. A backup snapshot allows the state of a system, such as primary system 102, to be rolled back to a moment in time for which a backup snapshot is stored. A system may store a large number of backup snapshots (e.g., thousands, millions). Each backup snapshot may require a significant amount of storage (e.g., GBs, TBs, PBs, etc.). In some situations, it may be desirable to archive a backup snapshot or one or more files included in a backup snapshot, to a remote storage location, such as archival storage tier 125.

For example, one or more older backup snapshots, or one or more older versions of a content file, may be archived to an archival storage tier for long-term retention. One or more backup snapshots may be archived to an archival storage tier for data recovery purposes (e.g., other storage systems may access the data associated with a backup snapshot in the event a storage location that locally stores the backup snapshot goes offline). One or more backup snapshots may be archived to an archival storage tier to handle spikes in storage demand. One or more backup snapshots that include cold data (i.e., data that is not accessed frequently) may be archived to an archival storage tier to free up local storage for one or more backup snapshots that include hot data (i.e., data that is accessed frequently). One or more cold content files (i.e., content files that are not accessed more than a threshold number of times within a threshold period) may be archived to an archival storage tier to free up local storage for one or more hot content files (i.e., content files that are accessed more than a threshold number of times within a threshold period).

The file system data associated with a backup snapshot may be archived by a storage system to a cloud storage location. The storage system may serialize the tree data structure associated with the backup snapshot into a serialized data file prior to archiving the serialized data file and the file system data associated with the backup snapshot to the cloud storage location. The serialized data file includes a plurality of data blocks where each data block corresponds to one of the tree data structures associated with the backup snapshot. A block that corresponds to a root node or intermediate node of the tree data structure includes a file offset to another data block of the serialized data file that corresponds to another node of the tree data structure. A serialized data file enables the storage system to restore one or more files included in the serialized data file without having to reconstruct an entire tree data structure that corresponds to the backup snapshot that is associated with the one or more files.

An archive policy may indicate that a full snapshot archive of a backup snapshot, an incremental snapshot archive of the backup snapshot, a full file snapshot archive of one or more files included in a backup snapshot, or an incremental file snapshot archive of one or more files included in a backup snapshot is to be performed and stored at a cloud storage location, such as archival storage tier 125. A full snapshot archive may include a complete view of file system data at a particular moment in time (e.g., a snapshot tree and one or more file metadata structures). A full snapshot archive includes data blocks that correspond to a root node associated with the view at the particular moment in time and any intermediate nodes and/or leaf nodes associated with the root node.

An incremental snapshot archive includes a partial view of file system data at a particular moment in time (e.g., portions of a snapshot tree and portions of one or more file metadata structures that were not previously archived). An incremental snapshot archive includes data blocks that correspond to nodes that were not previously archived.

A full file snapshot archive includes a complete view of a content file at a particular moment in time. The full file snapshot archive is a serialized data file that includes data blocks that correspond to the nodes of a file metadata structure needed to be traversed to determine a storage location of all the data chunks associated with the content file.

An incremental file snapshot archive includes a partial view of a content file at a particular moment in time. The incremental file snapshot archive is a serialized data file that includes data blocks that correspond to the nodes of a tree data structure needed to be traversed to determine a storage location of data chunks associated with the content file that were not previously archived.

In the example shown, archive data 900 can be archived by a storage system, such as storage system 112, to a remote storage location, such as archival storage tier 125. In the example shown, archive data 900 includes file system data 951 and serialized tree data 961.

In some embodiments, archive data 900 corresponds to a full snapshot archive, and is a representation of the snapshot tree at a particular moment in time, t=1. A full snapshot archive may provide a complete view of the nodes of a backup snapshot at a particular moment in time (i.e., all nodes associated with a root node of the snapshot tree) and the data stored in each of the leaf nodes of the snapshot tree. A full snapshot archive is independent on its own and does not refer back to one or more previous snapshot archives. The data blocks of serialized tree data 961 may correspond to the nodes shown in FIG. 7A. In some embodiments, data blocks 922, 924, 926, 928, or 930 include a file offset to a data block of an archive data file that corresponds to a file metadata structure.

In some embodiments, archive data 900 corresponds to a full file snapshot archive and is a representation of a file metadata structure at t=1. A full file snapshot archive includes a complete view of the nodes of a file metadata structure at a particular moment in time (i.e., all nodes indirectly or directly referenced by a root node of the file metadata structure) and the data stored in each of the leaf nodes of the file metadata structure. A full snapshot archive is independent on its own and does not refer back to one or more previous snapshot archives. The data blocks of serialized tree data 961 may correspond to the nodes shown in FIG. 8A. File system data 951 may include the data chunks referenced by leaf nodes 822, 824, 826, 828, 830.

File system data of archive data includes data stored in or referenced by the one or more leaf nodes of a tree data structure. In some embodiments, file system data 951 corresponds to data stored in the leaf nodes of the snapshot tree at time t=1 and/or the data stored in the leaf nodes of the file metadata structure at time t=1. The file system data includes data chunks of the one or more content files included in a backup snapshot that corresponds to the particular moment in time. In some embodiments, the file system data includes file system metadata, such as file size, directory structure, file permissions, physical storage locations of the files, etc.

A serialized data file is configured to store the structure of a tree data structure associated with the file system data as a flat set of data that is comprised of one or more data blocks. Each data block of the flat set of data corresponds to one of the nodes of the tree data structure. A data block may contain a file offset. A file offset represents a pointer of a tree data structure. Because some archive systems cannot store pointers, a file offset is used in place of pointers. The file offset may be to another data block of the serialized data file. The file offset may be to another data block of a different serialized data file.

In some embodiments, serialized tree data 961 corresponds to a snapshot tree at time t=1. Serialized snapshot tree data 961 is comprised of a plurality of data blocks. Each data block corresponds to one of the snapshot tree nodes. For example, blocks 922, 924, 926, 928, 930, 912, 914, and 902 correspond to nodes 722, 724, 726, 728, 730, 712, 714, and 702, respectively, of the snapshot tree at t=1 in FIG. 7A.

Block 902 corresponds to root node 702. Because root node 702 includes pointers to intermediate nodes 712 and 714, block 902 includes file offsets to blocks 912 and 914. Blocks 912 and 914 correspond to intermediate nodes 712 and 714, respectively. Because intermediate node 712 includes pointers to leaf nodes 722, 724, and 726, block 912 includes file offsets to blocks 922, 924, and 926. The file offsets correspond to the pointers of a snapshot tree. Similarly, block 914 includes file offsets to blocks 928, 930 because intermediate node 714 includes pointers to leaf nodes 728, 730.

Blocks 922, 924, 926, 928, and 930 correspond to the leaf nodes of snapshot tree 700 and each include a corresponding file offset to one or more blocks of the file system data stored in file system data 951. For example, block 922 includes an offset to one or more blocks in file system data 951 that stores the value of L1. Similarly, blocks 924, 926, 928, 930 include corresponding offsets to one or more blocks in file system data 951 that store the value of L2, L3, L4, and L5, respectively.

In some embodiments, serialized tree data 961 corresponds to a file metadata structure at time t=1. Serialized tree data 961 is comprised of a plurality of blocks. Each block corresponds to one of the snapshot tree nodes. For example, blocks 922, 924, 926, 928, 930, 912, 914, and 902 correspond to nodes 822, 824, 826, 828, 830, 812, 814, and 802, respectively, of the snapshot tree at t=1 in FIG. 8A.

Block 902 corresponds to root node 802. Because root node 802 includes pointers to intermediate nodes 812 and 814, block 902 includes file offsets to blocks 912 and 914. Blocks 912 and 914 correspond to intermediate nodes 812 and 814, respectively. Because intermediate node 812 includes pointers to leaf nodes 822, 824, and 826, block 912 includes file offsets to blocks 922, 924, and 926. The file offsets correspond to the pointers of a snapshot tree. Similarly, block 914 includes file offsets to blocks 928, 930 because intermediate node 814 includes pointers to leaf nodes 828, 830.

Blocks 922, 924, 926, 928, and 930 correspond to the leaf nodes of snapshot tree 800 and each include a corresponding file offset to one or more blocks of the file system data stored in file system data 951. For example, block 922 includes an offset to one or more blocks in file system data 951 that stores the value of L1. Similarly, blocks 924, 926, 928, 930 include corresponding offsets to one or more blocks in file system data 951 that store the value of L2, L3, L4, and L5, respectively.

Figure 9B:
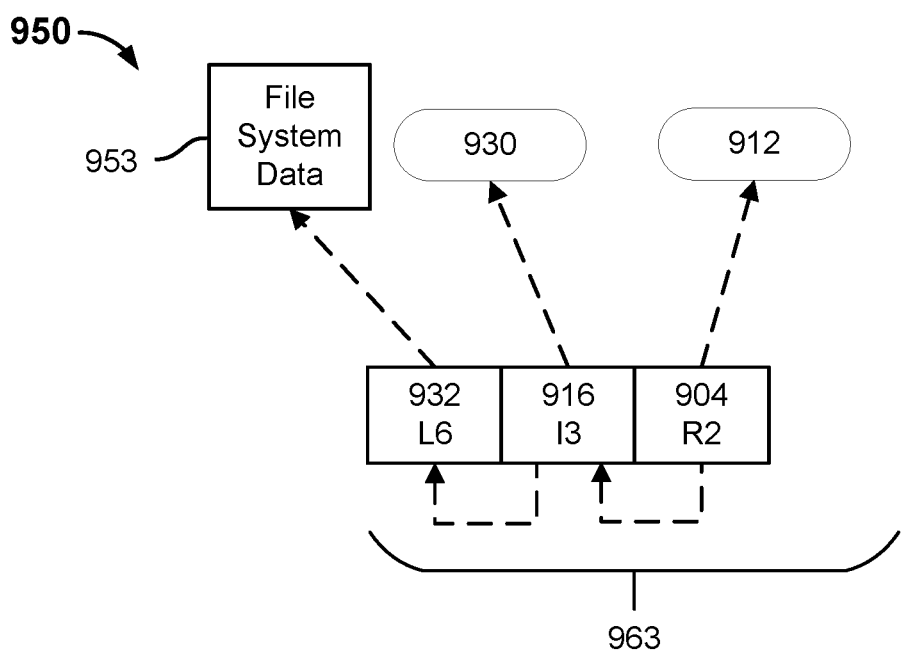
FIG. 9B is a block diagram illustrating an embodiment of archive data.

FIG. 9B is a block diagram illustrating an embodiment of archive data. In the example shown, archive data 950 can be archived by a system, such as storage system 112. In the example shown, archive data 950 includes file system data 953 and a serialized tree data 963.

In some embodiments, archive data 950 corresponds to an incremental snapshot archive and is a partial representation of the snapshot tree at a particular moment in time, t=2. An incremental snapshot archive may include changes to the data of a snapshot tree since a last snapshot archive (e.g., new data or modified data). For example, file system data 953 may include one or more values stored in leaf nodes of the snapshot tree at time t=2 that were not previously archived. Serialized tree data 963 is a serialized version of one or more nodes of the snapshot tree at time t=2 and includes data blocks corresponding to the one or more nodes of a snapshot tree that were not previously archived.

In some embodiments, archive data 950 corresponds to an incremental file snapshot archive and is a partial representation of the file metadata structure at a particular moment in time, t=2. An incremental file snapshot archive may include changes to the data of a file metadata structure since a last file snapshot archive (e.g., new data or modified data). For example, file system data 953 may include one or more data chunks of a content file that were not previously archived. Serialized tree data 963 may be a serialized version of one or more nodes of the file metadata structure at time t=2 and includes data blocks corresponding to the one or more nodes of a file metadata structure that were not previously archived.

In some embodiments, serialized tree data 963 corresponds to the snapshot tree at t=2 having root node 704. Serialized snapshot tree data 963 is comprised of a plurality of blocks. Blocks 932, 916, 904 correspond to nodes 732, 716, 704, respectively. Block 904 corresponds to root node 704. Because root node 704 includes a pointer to intermediate node 712, block 904 includes a file offset to block 912 of serialized tree data 961. Previously stored serialized tree data 961 already includes block 912 that corresponds to intermediate node 712. A file offset to a previously stored serialized tree data is used to save memory and prevent storing duplicative data. Root node 704 also includes a pointer to intermediate node 716. Similarly, block 904 also includes a file offset to block 916, which corresponds to intermediate node 716. Block 916 corresponds to intermediate node 716, which includes pointers to leaf nodes 730, 732. The value of leaf node 730 has not changed and was previously stored in file system data 951. To save memory and prevent storing duplicative data, block 916 includes a file offset to block 930 of serialized snapshot tree data 961. Block 916 also includes a file offset to block 932. Block 932 corresponds to leaf node 732. Intermediate node 716 is a new node because snapshot tree 700 did not include intermediate node 716. Thus, serialized tree data 963 includes a block that corresponds to intermediate node 716. Block 932 corresponds to leaf node 732 of snapshot tree 755. Leaf node 732 is a new node because snapshot tree 700 did not include leaf node 732. Thus, serialized tree data 963 includes a block that corresponds to leaf node 732. Block 932 includes a file offset to one or more blocks in file system data 953 that store the value of leaf node 732.

In some embodiments, serialized tree data 963 corresponds to the file metadata structure at t=2 with root node 804. Serialized tree data 963 is comprised of a plurality of blocks. Blocks 932, 916, 904 correspond to nodes 832, 816, 804, respectively. Block 904 corresponds to root node 804. Because root node 804 includes a pointer to intermediate node 812, block 904 includes a file offset to block 912 of serialized snapshot tree data 961. Previously stored serialized snapshot tree data 961 already includes block 912 that corresponds to intermediate node 812. A file offset to a previously stored serialized snapshot tree data is used to save memory and prevent storing duplicative data. Root node 804 also includes a pointer to intermediate node 816. Similarly, block 904 also includes a file offset to block 916, which corresponds to intermediate node 816. Block 916 corresponds to intermediate node 816. Intermediate node 816 includes pointers to leaf nodes 830, 832. The value of leaf node 830 has not changed and was previously stored in file system data 951. To save memory and prevent storing duplicative data, block 916 includes a file offset to block 930 of serialized snapshot tree data 961. Block 916 also includes a file offset to block 932. Block 932 corresponds to leaf node 832. Intermediate node 816 is a new node because snapshot tree 800 did not include intermediate node 816. Thus, serialized snapshot tree data 963 includes a block that corresponds to intermediate node 816. Block 932 corresponds to leaf node 832 of snapshot tree 850. Leaf node 832 is a new node because snapshot tree 800 did not include leaf node 832. Thus, serialized snapshot tree data 963 includes a block that corresponds to leaf node 832. Block 932 includes a file offset to one or more blocks in file system data 953 that store the value of leaf node 832.

Figure 10A:
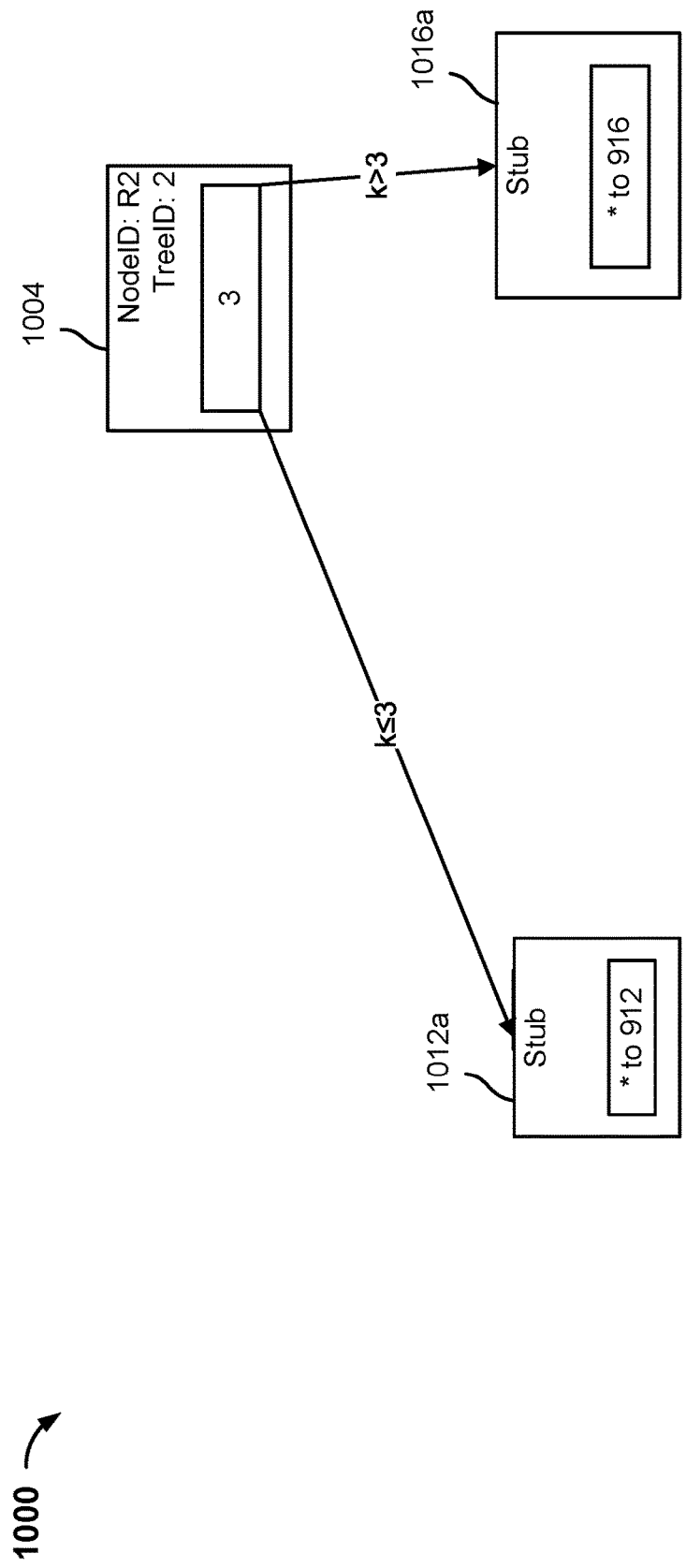
FIG. 10A is a block diagram illustrating an embodiment of a partially restored tree data structure.

FIG. 10A is a block diagram illustrating an embodiment of a partially restored tree data structure. In the example shown, partially restored tree data structure 1000 may be restored by a storage system, such as storage system 112. The tree data structure may correspond to a snapshot tree or a file metadata structure.

In some embodiments, a request to access specific portions of data of archived file system data (e.g., data associated with one or more files) at a particular time is received. A portion of the tree data structure with the specific portions of data of the archived file system data may be restored to provide access to the specific portions of data of the archived file system data. In some embodiments, the non-requested portions of the tree data structure are pre-fetched from archival storage tier and restored as a background operation of the storage system.

To restore a portion of the tree data structure associated with the specific portions of data of the archived file system data at the particular time, a snapshot archive corresponding to the particular time is identified. The identified snapshot archive includes serialized tree data corresponding to the tree data structure at the particular time. The identified snapshot archive also includes file system data corresponding to the file system data at the particular time.

In the example shown, a request for a specific archived file at time t=2 is received. Tree data structure 850 includes a file metadata structure at time t=2. The file metadata structure at time t=2 includes root node 804, intermediate nodes 812, 816, and leaf nodes 822, 824, 826, 830, 832. The file metadata structure at time t=2 has a corresponding archive data 950. Archive data 950 includes file system data 953 and serialized tree data 963. Serialized tree data 963 is identified as the serialized tree data corresponding to the particular time.

Metadata of a root node of the identified serialized tree data may be obtained. In the example shown, metadata is obtained from a block of the identified serialized tree data. The metadata may include a file offset to another block of the same serialized tree data, a file offset to one or more blocks of file system data associated with the serialized tree data, or a file offset to another block of a different serialized tree data. For example, block 904 corresponds to the root node 804 of the snapshot tree at time t=2. Block 904 includes a file offset to block 916 of serialized snapshot tree data 963 and a file offset to block 912 of serialized snapshot tree data 961. The metadata may also include a node ID, a view ID, and/or one or more node keys.

The obtained metadata of the root node from the identified serialized tree data may be used to reconstruct a partial tree data structure instance that includes a representation of the root node that references one or more intermediate nodes. For example, partially restored snapshot tree 1000 may be created based on serialized snapshot tree data 963. Partially restored snapshot tree 1000 includes a root node 1004, stub node 1012a, and stub node 1016a, which correspond to block 904 of serialized snapshot tree data 963, block 912 of serialized snapshot tree data 961, and block 916 of serialized snapshot tree data 963, respectively.

Similar to root node 804, root node 1004 includes a nodeID of "R2," a TreeID of "2," and a node key of "3." Root node 1004 includes a first set of pointers and a second set of pointers. The first set of pointers indicates that to determine a value of a data key that is less than or equal to the node key of "3," partially restored snapshot tree 1000 will be traversed to stub node 1012a. The second set of pointers indicates that to determine a value of a data key that is greater than the node key of "3," partially restored snapshot tree 1000 will be traversed to stub node 1016a.

Figure 10B:
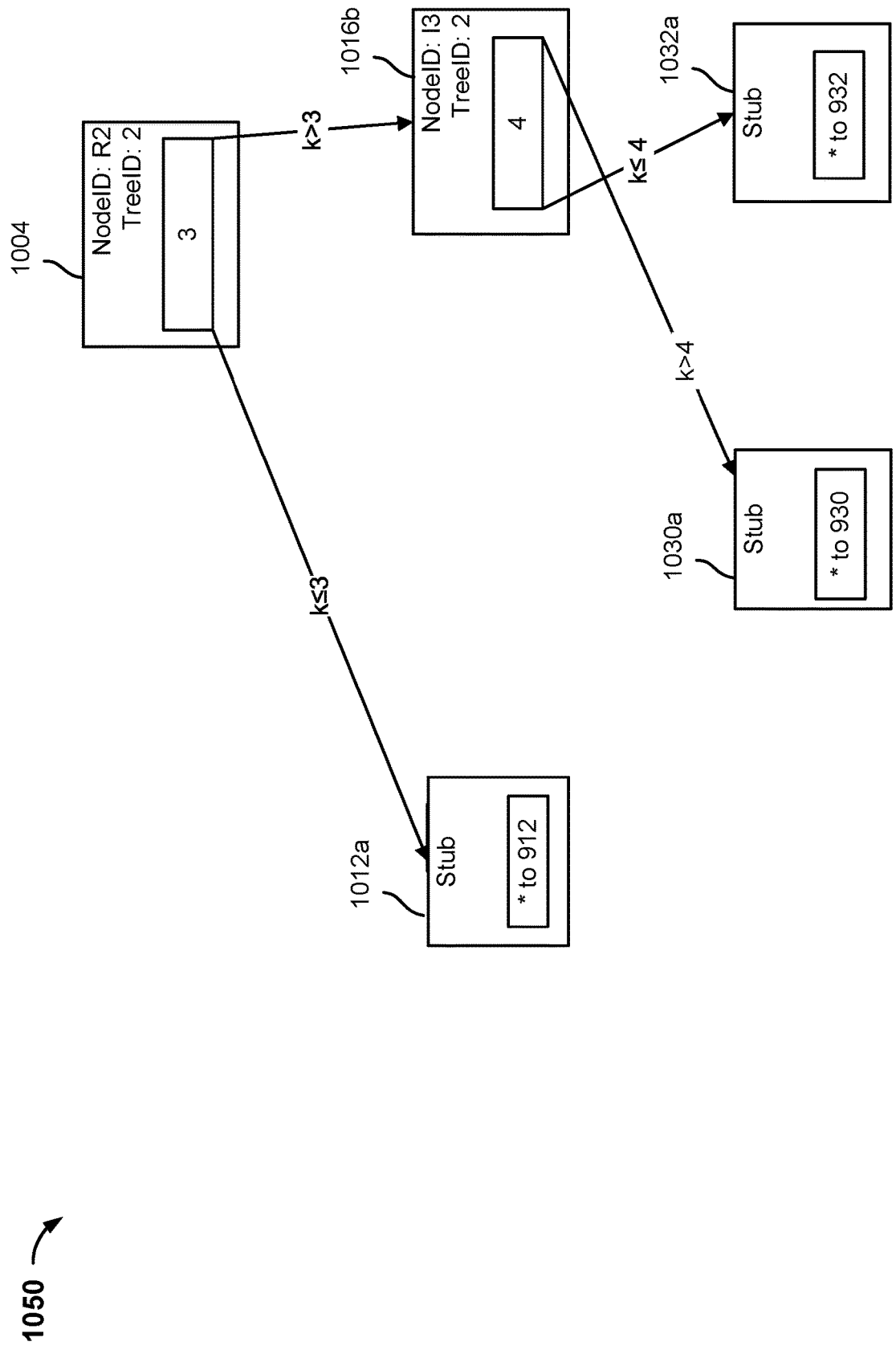
FIG. 10B is a block diagram illustrating an embodiment of a partially restored tree data structure.

FIG. 10B is a block diagram illustrating an embodiment of a partially restored tree data structure. In the example shown, partially restored tree data structure 1050 may be restored by a storage system, such as storage system 112. In some embodiments, partially restored snapshot tree 1050 is a continuation of the restoring partially restored snapshot tree 1000 in response to a request to access specific portions of data of archived file system data at a particular time is received.

Partially restored snapshot tree 1050 includes root node 1004, intermediate node 1016b, stub node 1012a, stub node 1030a, and stub node 1032A. In the example shown, a request for a data value associated with a key value of "4" at time t=2 was received. To determine the data value associated with the key value of "4," partially restored snapshot tree 1000 is traversed from root node 1004 to stub node 1016a because the data key of "4" is greater than the node key associated with root node 1004 (e.g., "3"). Stub node 1016a includes a pointer to block 916 of serialized snapshot tree data 963. Metadata corresponding to stub node 1016a, i.e., metadata included in block 916 of serialized snapshot tree data 963, is obtained from the remote storage location.

The metadata included in block 916 of serialized snapshot tree data 963 may be used to update partially restored snapshot tree 1000 to become partially restored snapshot tree 1050. The metadata included in block 916 of serialized snapshot tree data 963 includes a nodeID of "I3," a TreeID of "2," a file offset to block 930 of serialized snapshot tree data 961 and a file offset to block 932 of serialized snapshot tree data 963. As seen in FIGS. 10A and 10B, stub node 1016a has been updated to become intermediate node 1016b. Intermediate node 1016b corresponds to intermediate node 816 of FIG. 8B. Similar to intermediate node 816, intermediate node 1016b includes a nodeID of "I3," a TreeID of "2," and a node key of "4." Intermediate node 1016b includes a first set of pointers and a second set of pointers. The first set of pointers indicates that to determine a value of a data key that is less than or equal to the node key of "4," partially restored snapshot tree 1050 will be traversed from intermediate node 1016b to stub node 1032A. The second set of pointers indicates that to determine a value of a data key that is greater than the node key of "4," partially restored snapshot tree 1050 will be traversed from intermediate node 1016b to stub node 1030a.

Intermediate node 1016b includes a pointer to stub node 1030a and a pointer to stub node 1032A because block 916 of serialized snapshot tree data 963 includes a file offset to block 930 of serialized snapshot tree data 961 and a file offset to block 932 of serialized snapshot tree data 963, respectively.

Stub node 1030a includes a pointer to block 930 of serialized snapshot tree data 961 because block 916 of serialized snapshot tree data 963 includes a file offset to block 930 of serialized snapshot tree data 961. Stub node 1032A includes a pointer to block 932 of serialized snapshot tree data 963 because block 916 of serialized snapshot tree data 963 includes a file offset to block 932 of serialized snapshot tree data 963.

Figure 10C:
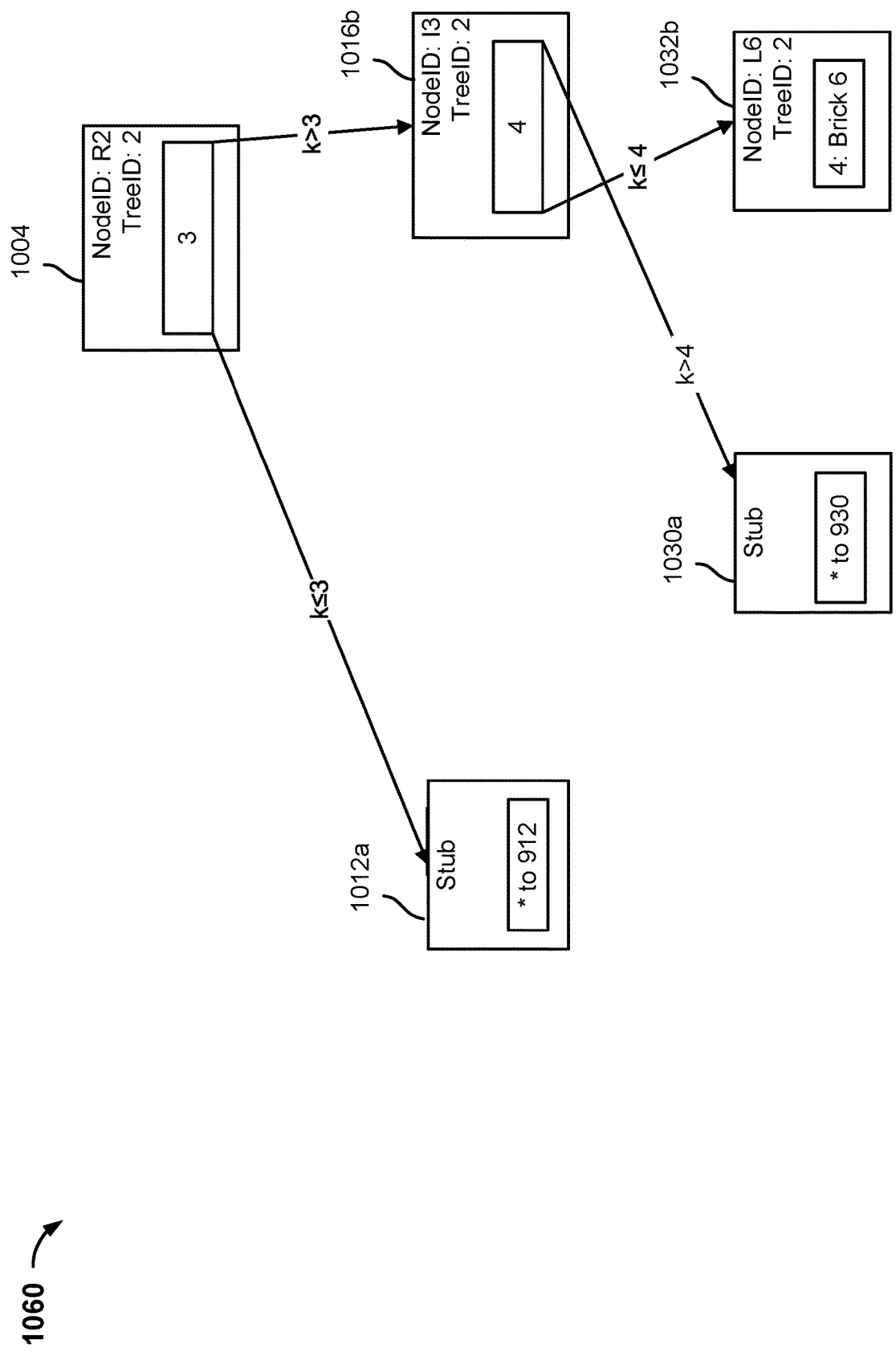
FIG. 10C is a block diagram illustrating an embodiment of a partially restored tree data structure.

FIG. 10C is a block diagram illustrating an embodiment of a partially restored tree data structure. In the example shown, partially restored tree data structure 1060 may be restored by a storage system, such as storage system 112. In some embodiments, partially restored tree data structure 1060 is a continuation of the restoring of partially restored tree data structure 1050 in response to a request to access specific portions of data of archived file system data at a particular time is received.

Partially restored snapshot tree 1060 includes root node 1004, intermediate node 1016b, stub node 1012a, stub node 1030a, and leaf node 1032B. In the example shown, a request for a data value associated with a key value of "4" at time t=2 was received. To determine the data value associated with the key value of "4," partially restored tree data structure 1050 is traversed from root node 1004 to intermediate node 1016b because the data key of "4" is greater than the node key associated with root node 1004 (e.g., "3"). Partially restored tree 1050 is further traversed from intermediate node 1016b to stub node 1032A because the data key of "4" is less than or equal to the node key associated with intermediate node 1016b (e.g., "4"). Stub node 1032A includes a pointer to block 932 of serialized snapshot tree data 963. Metadata corresponding to stub node 1032A, i.e., metadata included in block 932 of serialized snapshot tree data 963, is obtained from the remote storage location.

The metadata included in block 932 of serialized snapshot tree data 963 may be used to update partially restored snapshot tree 1050 to become partially restored snapshot tree 1060. The metadata included in block 932 of serialized snapshot tree data 963 includes a nodeID of "L6," a TreeID of "2," and a file offset to one or more blocks of file system data 953. As seen in FIGS. 10B and 10C, stub node 1032A has been updated to become leaf node 1032B. Leaf node 1032B corresponds to leaf node 832 of FIG. 8B. Similar to leaf node 832, leaf node 1032b includes a nodeID of "L6," a TreeID of "2," and a data value of "Brick 6" associated with a data key of "4."

In some embodiments, the data value stored in a leaf node is a pointer to a storage location in the remote storage location storing the data. In other embodiments, the data value stored in the leaf node is a pointer to a block of serialized snapshot tree data that corresponds to a root node of another snapshot tree.

For the other portions of the one or more requested files, the tree data structure may be partially restored in a similar manner as described with respect to FIGS. 10A-10C.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving, by a storage system, a request for one or more files to be restored to a primary storage system;
  requesting, by the storage system from a cloud storage provider, access to a first portion of the one or more files stored at an archival storage tier, wherein in response to the access request, the cloud storage provider changes a storage class associated with the first portion of the one or more files from the archival storage tier of the cloud storage to a different storage tier of the cloud storage, wherein a size of the first portion of the one or more files requested by the storage system corresponds to a storage threshold associated with the different storage tier;

providing, by the storage system, the access to the first portion in response to the request to restore the one or more files to the primary storage system in part by restoring, by the storage system, the first portion of the one or more files from the different storage tier of the cloud storage to the primary storage system via the storage system; and based at least in part on a metric associated with a utilization of the first portion, determining when to request access to a second portion of the one or more files stored at the archival storage tier.

2. The method of claim 1, wherein the one or more files are determined to have been archived at the archival storage tier based on an index stored at the storage system.

3. The method of claim 2, wherein the index associates a file identifier associated with a file of the one or more files with a corresponding storage location.

4. The method of claim 1, wherein requesting access to the first portion of the one or more files stored at the archival storage tier includes requesting the storage class associated with the first portion of the one or more files to be changed from the archival storage tier to the different storage tier of the cloud storage.

5. The method of claim 1, wherein providing the access to the first portion includes traversing and updating a partially restored tree data structure based on data associated with the first portion of the one or more files stored at the different storage tier of the cloud storage.

6. The method of claim 5, wherein providing the access to the first portion further includes restoring the data associated with the first portion of the one or more files from the different storage tier of the cloud storage to the primary storage system.

7. The method of claim 1, wherein providing the access to the first portion includes requesting the cloud storage provider to change a storage class for data associated with a file included in the first portion of the one or more files after the data associated with the file included in the first portion of the one or more files is restored from the different storage tier of the cloud storage to the primary storage system.

8. The method of claim 1, further comprising:
monitoring a rate at which data associated with the first portion of the one or more files is being restored from the different storage tier of the cloud storage to the primary storage system; and
adjusting when to request the access to the second portion of the one or more files stored at the archival storage tier.

9. The method of claim 1, wherein the metric associated with the utilization of the first portion is based in part on a rate at which the cloud storage provider is able to change a storage class for data associated with the first portion of the one or more files from the archival storage tier to the different storage tier of the cloud storage.

10. The method of claim 1, wherein the metric associated with the utilization of the first portion is based in part on a rate at which the storage system is able to restore data associated with the first portion of the one or more files from the different storage tier of the cloud storage to the primary storage system.

11. The method of claim 1, further comprising requesting the access to one or more additional portions of the one or more files stored at the archival storage tier.

12. The method of claim 11, wherein requesting access to the one or more additional portions of the one or more files is requested prior to a previous portion of one or more portions of the one or more files being completely restored to the primary storage system.

13. The method of claim 11, further comprising providing the access to the one or more additional portions of the one or more files stored at the archival storage tier.

14. The method of claim 13, wherein providing the access to the one or more additional portions of the one or more files stored at the archival storage tier includes requesting that one of the one or more additional portions of the one or more files stored at the different storage tier of the cloud storage be stored in the different storage tier of the cloud storage beyond a threshold period in the event a previous portion of the one or more files is unable to be restored to the primary storage system within a threshold amount of time.

15. The method of claim 11, wherein requesting the access to the one or more additional portions of the one or more files is based at least in part on at least one of an amount of data that is to be included in an additional portion, a quality of service, a priority of request, and/or a time of a request.

16. A computer program product embodied in a non-transitory computer readable medium and comprising computer instructions for:
receiving, by a storage system, a request for one or more files to be restored to a primary storage system;
requesting, by the storage system from a cloud storage provider, access to a first portion of the one or more files stored at an archival storage tier, wherein in response to the access request, the cloud storage provider changes a storage class associated with the first portion of the one or more files from the archival storage tier of the cloud storage to a different storage tier, wherein a size of the first portion of the one or more files requested by the storage system corresponds to a storage threshold associated with the different storage tier;
providing, by the storage system, the access to the first portion in response to the request to restore the one or more files to the primary storage system in part by restoring, by the storage system, the first portion of the one or more files from the different storage tier of the cloud storage to the primary storage system via the storage system; and
based at least in part on a metric associated with a utilization of the first portion, determining when to request access to a second portion of the one or more files stored at the archival storage tier.

17. The computer program product of claim 16, further comprising computer instructions for requesting access to one or more additional portions of the one or more files stored at the archival storage tier.

18. The computer program product of claim 17, wherein requesting access to one or more additional portions of the one or more files is requested prior to a previous portion of one or more portions of the one or more files being completely restored to the primary storage system.

19. A system, comprising:
a processor configured to:
- receive, by a storage system, a request for one or more files to be restored to a primary storage system;
- request, by the storage system from a cloud storage provider, access to a first portion of the one or more files stored at an archival storage tier, wherein in response to the access request, the cloud storage provider changes a storage class associated with the first portion of the one or more files from the archival storage tier of the cloud storage to a different storage tier of the cloud storage;
- provide, by the storage system, the access to the first portion in response to the request to restore the one or more files to the primary storage system in part by restoring, by the storage system, the first portion of the one or more files from the different storage tier of the cloud storage to the primary storage system via the storage system, wherein a size of the first portion of the one or more files requested by the storage system corresponds to a storage threshold associated with the different storage tier; and
- based at least in part on a metric associated with a utilization of the first portion, determine when to request access to a second portion of the one or more files stored at the archival storage tier; and a memory coupled to the processor and configured to provide the processor with instructions.

* * * * *